United States Patent
Tomeba et al.

(10) Patent No.: US 11,483,784 B2
(45) Date of Patent: Oct. 25, 2022

(54) TRANSMISSION AND RECEPTION OF SYNCHRONIZATION SIGNAL BLOCKS IN A WIRELESS NETWORK

(71) Applicants: SHARP KABUSHIKI KAISHA, Sakai (JP); FG innovation Company Limited, Tuen Mun (HK)

(72) Inventors: Hiromichi Tomeba, Sakai (JP); Ryota Yamada, Sakai (JP); Hideo Nanba, Sakai (JP); Atsushi Shirakawa, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 24 days.

(21) Appl. No.: 16/967,714

(22) PCT Filed: Feb. 5, 2019

(86) PCT No.: PCT/JP2019/004093
§ 371 (c)(1),
(2) Date: Aug. 5, 2020

(87) PCT Pub. No.: WO2019/156085
PCT Pub. Date: Aug. 15, 2019

(65) Prior Publication Data
US 2021/0045076 A1  Feb. 11, 2021

(30) Foreign Application Priority Data
Feb. 9, 2018  (JP)  .............................. JP2018-021752

(51) Int. Cl.
*H04W 56/00* (2009.01)
*H04B 7/0413* (2017.01)
(Continued)

(52) U.S. Cl.
CPC ........ *H04W 56/001* (2013.01); *H04B 7/0413* (2013.01); *H04B 7/0617* (2013.01);
(Continued)

(58) Field of Classification Search
CPC ............. H04L 41/028; H04L 25/03012; H04L 27/2671; H04W 56/001; H04W 56/002; H04W 76/27
See application file for complete search history.

(56) References Cited

U.S. PATENT DOCUMENTS

2020/0053673 A1* 2/2020 Reial ................... H04W 56/001
2020/0205095 A1* 6/2020 Åström et al. ........ H04W 48/12
(Continued)

OTHER PUBLICATIONS

R1-1715145, "WF on Network Assisted SS Block Repetition", Aug. 21-25, 2017, pp. 1-6 (Year: 2017).*
(Continued)

*Primary Examiner* — Salvador E Rivas
(74) *Attorney, Agent, or Firm* — ScienBiziP, P.C.

(57) ABSTRACT

A base station apparatus provided with a function of performing communication using multiple beams implements appropriate beamforming while reducing interference power, thereby communication quality becomes stable and frequency efficiency or throughput is improved. The base station apparatus according to the present invention is a base station apparatus for communicating with a terminal apparatus, the base station apparatus including: a transmitter configured to transmit a synchronization signal block including a synchronization signal in a prescribed transmission window; and a controller configured to configure a size of the prescribed transmission window in which the synchronization signal block is transmitted, in which the transmitter notifies the terminal apparatus of information associated with QCL between two of the synchronization signal blocks transmitted in the prescribed transmission window.

10 Claims, 6 Drawing Sheets

(51) Int. Cl.
H04B 7/06 (2006.01)
H04W 72/04 (2009.01)
H04L 27/26 (2006.01)
H04L 25/03 (2006.01)

(52) U.S. Cl.
CPC ....... *H04L 27/2671* (2013.01); *H04W 72/042* (2013.01); *H04W 72/0446* (2013.01); *H04L 25/03012* (2013.01)

(56) References Cited

U.S. PATENT DOCUMENTS

2020/0322932 A1* 10/2020 Kim .................... H04W 72/042
2020/0404537 A1* 12/2020 Harada ................ H04J 11/0073

OTHER PUBLICATIONS

"IMT Vision—Framework and overall objectives of the future development of IMT for 2020 and beyond", M Series, Mobile, radiodetermination, amateur and related satellite services, Recommendation ITU-R M.2083-0, (Sep. 2015).
E. G. Larsson et al., "Massive MIMO for next generation wireless systems", IEEE Communications Magazine, vol. 52, No. 2, pp. 186-195, Feb. 2014.
ZTE, ZTE Microelectronics, "Considerations on SS burst design", R1-1611269, 3GPP TSG RAN WG1 Meeting #87 Reno, USA, Nov. 14-18, 2016.
ZTE, Sierra Wireless, CMCC, "WF on Network Assisted SS Block Repetition", R1-1715145, 3GPP TSG RAN WG1 Meeting #90 Prague, Czechia, Aug. 21-25, 2017.

* cited by examiner

TRANSMISSION AND RECEPTION OF SYNCHRONIZATION SIGNAL BLOCKS IN A WIRELESS NETWORK

TECHNICAL FIELD

The present invention relates to a base station apparatus, a terminal apparatus, and a communication method.

This application claims priority based on JP 2018-21752 filed on Feb. 9, 2018, the contents of which are incorporated herein by reference.

BACKGROUND ART

Research and development activities related to the 5th generation mobile radio communication system (5G system) have been actively carried out, aiming to start commercial services around the year 2020. A vision recommendation on the standard system of the 5G system (International Mobile Telecommunication-2020 and beyond: IMT-2020) was recently reported (see NPL 1) by the International Telecommunication Union Radio Communications Sector (ITU-R), an international standardization body.

Reserving frequency resources is an important issue for the communication system to handle a rapid increase of data traffic. Therefore, one of the targets in 5G is to achieve ultra-large capacity communication using a higher frequency band than the frequency band used in Long Term Evolution (LTE).

However, radio communication using a high frequency band has a problem in path loss. In order to compensate for the path loss, beamforming by using a large number of antennas has become a promising technique (see NPL 2). It is also contemplated to compensate for the path loss by including multiple antennas (antenna panels) for each of which independent beamforming is configured, and appropriately switching the antennas.

Furthermore, in order to improve frequency efficiency for a plane, it is effective to increase the number of base station apparatuses per unit area. As the density of the base station apparatuses improves, the number of connected users per base station apparatus is limited, and an effect that a communication distance between the base station apparatus and the user is shortened can be obtained.

CITATION LIST

Non Patent Literature

NPL 1: "IMT Vision—Framework and overall objectives of the future development of for 2020 and beyond," Recommendation ITU-R M. 2083-0, September 2015.

NPL 2: E. G. Larsson, O. Edfors, F. Tufvesson, and T. L. Marzetta, "Massive MIMO for next generation wireless system," IEEE Commun. Mag., vol. 52, no. 2, pp. 186-195, February 2014.

SUMMARY OF INVENTION

Technical Problem

However, increase in density of the base station apparatuses means that the influence of interference signals arriving from other base station apparatuses also increases for each user. In particular, beamforming is essential in radio communication in a high frequency band, but improvement in signal quality by beamforming also means to increase interference power given to other communication apparatuses, which causes, as a result, a problem that a reception signal to noise plus noise power ratio of a user decreases in a case that the density of the base station apparatuses is high.

An aspect of the present invention has been made in view of these circumstances, and an object of the present invention is to provide a base station apparatus, a terminal apparatus, and a communication method capable of causing communication quality to be stable and thus improving frequency efficiency or throughput, by implementing appropriate beamforming while reducing interference power by the base station apparatus provided with a function of performing communication using multiple beams.

Solution to Problem

To address the above-mentioned drawbacks, a base station apparatus, a terminal apparatus, and a communication method according to an aspect of the present invention are configured as follows.

(1) Specifically, a base station apparatus according to an aspect of the present invention is a base station apparatus for communicating with a terminal apparatus, the base station apparatus including: a transmitter configured to transmit a synchronization signal block including a synchronization signal in a prescribed transmission window; and a controller configured to configure a size of the prescribed transmission window in which the synchronization signal block is transmitted, in which the transmitter notifies the terminal apparatus of information associated with Quasi co-located (QCL) between two of the synchronization signal blocks transmitted in the prescribed transmission window.

(2) Furthermore, a base station apparatus according to an aspect of the present invention is described in (1), in which the controller may configure the maximum transmission number of the synchronization signal blocks transmitted by the transmitter in the prescribed transmission window, based on the size of the prescribed transmission window.

(3) Furthermore, a base station apparatus according to an aspect of the present invention is described in (2), in which the controller may configure a periodicity to configure the prescribed transmission window, based on the size of the prescribed transmission window.

(4) Furthermore, a base station apparatus according to an aspect of the present invention is described in (1), in which the transmitter may configure the size of the prescribed transmission window such that a primary cell and a secondary cell respectively have different values.

(5) Furthermore, a base station apparatus according to an aspect of the present invention is described in (1), in which there is at least a common part between a time resource of the synchronization signal block transmitted by the transmitter in the prescribed transmission window and a time resource of the synchronization signal block transmitted by the transmitter in the prescribed transmission window with a different size configured.

(6) Furthermore, a base station apparatus according to an aspect of the present invention is described in (1), in which a time resource of the synchronization signal block transmitted by the transmitter in the prescribed transmission window may be calculated based on a cell identity.

(7) Furthermore, a base station apparatus according to an aspect of the present invention is described in (1), and further includes a receiver configured to perform carrier sense, in which the controller may configure the size of the prescribed transmission window, based on a priority of the carrier sense performed by the receiver.

(8) Furthermore, a terminal apparatus according to an aspect of the present invention is a terminal apparatus for communicating with a base station apparatus, the terminal apparatus including: a receiver configured to receive a synchronization signal block including a synchronization signal in a prescribed transmission window; and a transmitter configured to transmit a signal including information associated with a time resource in which the synchronization signal block has been transmitted, in which the synchronization signal block is received based on a size of the prescribed transmission window configured by the base station apparatus.

(9) Furthermore, a communication method according to an aspect of the present invention is a communication method for a base station apparatus for communicating with a terminal apparatus, the communication method including the steps of: transmitting a synchronization signal block including a synchronization signal in a prescribed transmission window; configuring a size of the prescribed transmission window in which the synchronization signal block is transmitted; and notifying the terminal apparatus of information associated with QCL between two of the synchronization signal blocks transmitted in the prescribed transmission window.

Advantageous Effects of Invention

According to an aspect of the present invention, a base station apparatus provided with a function of performing communication using multiple beams implements appropriate beamforming while reducing interference power, thus making it possible to cause communication quality to be stable and improve frequency efficiency or throughput.

BRIEF DESCRIPTION OF EMBODIMENTS

A communication system according to the present embodiment includes a base station apparatus (a transmitting apparatus, cells, a transmitting point, a group of transmit antennas, a group of transmit antenna ports, component carriers, eNodeB, a transmission point, a transmission and/or reception point, a transmission panel, and an access point) and terminal apparatuses (a terminal, a mobile terminal, a receiving point, a reception terminal, a receiving apparatus, a group of receive antennas, a group of receive antenna ports, UE, a reception point, a reception panel, and a station), Furthermore, a base station apparatus connected to a terminal apparatus (base station apparatus that establishes a radio link with a terminal apparatus) is referred to as a serving cell.

1. First Embodiment

The base station apparatus and the terminal apparatus in the present embodiment can communicate in a frequency band in which a license is required (licensed band) and/or a frequency hand in which a license is not required (unlicensed band).

According to the present embodiments, "X/Y" includes the meaning of "X or Y". According to the present embodiments, "X/Y" includes the meaning of "X and Y". According to the present embodiments, "X/Y" includes the meaning of "X and/or Y".

Figure 1:
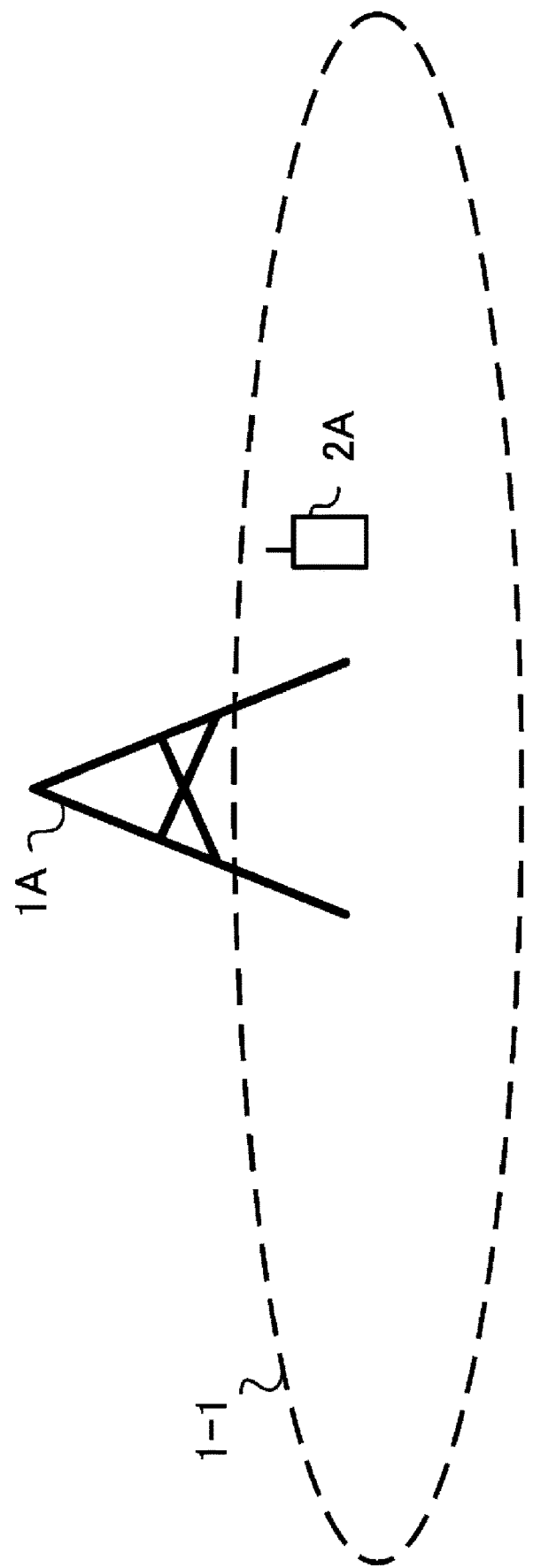
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. Coverage 1-1 is a range (a communication area) in which the base station apparatus 1A can connect to the terminal apparatus. Furthermore, the base station apparatus 1A is also simply referred to as a base station apparatus. Furthermore, the terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control CHannel (PUCCH)
Physical Uplink Shared CHannel (PUSCH)
Physical Random Access CHannel (PRACH)

The PUCCH is used to transmit Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/HACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared CHannel (UL-SCH) resource. The Channel State Information refers to a Rank Indicator (RI) for specifying a preferable spatial multiplexing number, a Precoding Matrix Indicator (PMI) for specifying a preferable precoder, a Channel Quality Indicator (CQI) for specifying a preferable transmission rate, a channel state information reference signal (CSI-Reference Signal (RS)) Resource Indicator (CSI-RS Resource Indicator (CRI)) for indicating a preferable CSI-RS resource, and the like.

The Channel Quality indicator (hereinafter, referred to as a CQI value) can be a preferable modulation scheme (e.g., QPSK, 16QAM, 64QAM, 256QAM, or the like) and a preferable coding rate in a prescribed band (details of which will be described later). The CQI value can be an index (CQI Index)) determined by the above change scheme, coding rate, and the like. The CQI value can take a value predetermined in the system.

The CRI indicates a CSI-RS resource whose received power/reception quality is preferable from multiple CSI-RS resources.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that some or all of the CQI value, the PMI value, the RI value, and the CRI value are also collectively referred to as a "CSI value".

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the uplink control information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. Here, the uplink reference signal includes a Demodulation Reference Signal (DMRS), a Sounding Reference Signal (SRS), and a Phase-Tracking Reference Signal (PT-RS).

The DMRS is associated with transmission of the PUSCH or the PUCCH. For example, the base station apparatus 1A uses DMRS in order to perform channel compensation of PUSCH or PUCCH. For example, the base station apparatus 1A uses SRS to measure an uplink channel state. Furthermore, the SRS is used for uplink observation (sounding). Furthermore, the PT-RS is used to compensate for phase noise. Note that the DMRS of the uplink is also referred to as an uplink DMRS.

In FIG. 1, the following downlink physical channels are used for the downlink radio communication from the base station apparatus 1A to the terminal apparatus 2A. The downlink physical channels are used for transmitting information output from the higher layer.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)

The PBCH is used for broadcasting a Master Information Block (MIB, a Broadcast CHannel (BCH)) that is used commonly by the terminal apparatuses. PCFICH is used for transmission of information for indicating a region (e.g., the number of Orthogonal Frequency Division Multiplexing (OFDM) symbols) to be used for transmission of PDCCH. Note that the MIB is also referred to as minimum system information.

PHICH is used for transmission of ACK/NACK with respect to uplink data (a transport block, a codeword) received by the base station apparatus 1A. In other words, PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, HACK for indicating an unsuccessful reception, and DTX for indicating that no corresponding data is present. In a case that PHICH for uplink data is not present, the terminal apparatus 2A reports ACK to a higher layer.

The PDCCH and the EPIDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

Furthermore, the DCI format for the uplink can be used to make a request (CSI request) of Channel State Information (CSI; also referred to as reception quality information) for the downlink.

The DCI format for the uplink can be used for a configuration for indicating an uplink resource to which a Channel State Information report (CSI feedback report) is mapped, the CSI feedback report being fed back to the base station apparatus by the terminal apparatus. For example, the CSI feedback report can be used for a configuration for indicating an uplink resource that periodically reports Channel State Information (periodic CSI). The CSI feedback report can be used for a mode configuration (CSI report mode) for periodically reporting the Channel State Information.

For example, the CSI feedback report can be used for a configuration for indicating an uplink resource that reports aperiodic Channel State Information (aperiodic CSI). The CSI feedback report can be used for a mode configuration (CSI report mode) for aperiodically reporting the Channel State Information.

For example, the CSI feedback report can be used for a configuration for indicating an uplink resource that reports semi-persistent Channel State Information (semi-persistent CSI). The CSI feedback report can be used for a mode configuration (CSI report mode) for semi-persistently reporting the Channel State Information.

The DCI format for the uplink can be used for a configuration for indicating a type of the CSI feedback report that is fed hack to the base station apparatus by the terminal apparatus. The type of the CSI feedback report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PUSCH resource is scheduled in accordance with the uplink grant, the terminal apparatus transmits uplink data and/or uplink control information on the scheduled PUSCH.

The PDSCH is used to transmit the downlink data (the downlink transport block, DL-SCH). PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be a common message to multiple terminal apparatuses in a cell. Furthermore, the RRC message transmitted from the base station apparatus 1A may be a dedicated message to a given terminal apparatus 2A (also referred to as dedicated signaling). In other words, user equipment specific (user equipment unique) information is transmitted by using the message dedicated to the certain terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration for indicating an uplink resource that periodically reports Channel State Information (periodic CSI). The CSI feedback report can be used for a mode configuration (CSI report mode) for periodically reporting the Channel State Information.

The type of the downlink Channel State Information report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer. Note that the synchronization signal includes a Primary Synchronization Signal (PSS) and a Secondary Synchronization Signal (SSS).

The synchronization signal is used for the terminal apparatus to obtain synchronization in the frequency domain and the time domain in the downlink. Furthermore, the synchronization signal is used to measure received power, reception quality, or Signal-to-Interference and Noise power Ratio (SINR). Note that the received power measured by the synchronization signal is also referred to as a Synchronization Signal-Reference Signal Received Power (SS-RSRP), the reception quality measured by the synchronization signal is also referred to as a Reference Signal Received Quality (SS-RSRQ), and the SINR measured by the synchronization signal is also referred to as an SS-SINR. Note that SS-RSRQ is a ratio between the SS-RSRP and the RSSI. The Received Signal Strength Indicator (RSSI) is the total average received power in a certain observation period. Furthermore, the synchronization signal/downlink reference signal is used for the terminal apparatus to perform channel compensation on a downlink physical channel. For example, the synchronization signal/downlink reference signal is used for the terminal apparatus to calculate the downlink channel state information.

Here, the downlink reference signals include a Cell-specific Reference Signal (CRS), a Demodulation Reference Signal (DMRS), a Non-Zero Power Channel State Information-Reference Signal (NZP CSI-RS), a Zero Power Channel State Information-Reference Signal (ZP CSI-RS), a PT-RS, and a Tracking Reference Signal (TRS). Note that the DMRS of the downlink is also referred to as a downlink DMRS. Note that in embodiments described below, a case of being simply described as the CSI-RS includes the NZP CSI-RS and/or the ZP CSI-RS.

CRS is transmitted in an entire band of a subframe and is used to perform demodulation of PBCH/PDCCH/PHICH/PCFICH/PDSCH. DMRS is transmitted in a subframe and a band that are used for transmission of PDSCH/PBCH/PDCCH/EPDCCH with which DMRS is associated, and is used to demodulate PDSCH/PBCH/PDCCH/EPDCCH with which DMRS is associated.

A resource for NZP CSI-RS is configured by the base station apparatus 1A. For example, the terminal apparatus 2A performs signal measurement (channel measurement) by using NZP CSI-RS. Furthermore, NZP CSI-RS is also used for beam scanning for searching a preferable beam direction, beam recovery in which recovery is performed in a case that the received power/reception quality in the beam direction degrades, or the like. A resource for ZP CSI-RS is configured by the base station apparatus 1A. With zero output, the base station apparatus 1A transmits ZP CSI-RS. The terminal apparatus 2A performs interference measurement in a resource to which ZP CSI-RS corresponds, for example.

Furthermore, CSI-RS is also used to measure received power, reception quality, or SINR. The received power measured by CSI-RS is also referred to as CSI-RSRP, the reception quality measured by CSI-RS is also referred to as CSI-RSRQ, and SINR measured by the CSI-RS is also referred to as CSI-SINR. Note that CSI-RSRQ is a ratio between CSI-RSRP and RSSI.

A Multimedia Broadcast multicast service Single Frequency Network (MBSFN) RS is transmitted in an entire band of the subframe used for transmitting PMCH. MBSFN RS is used to demodulate PMCH. PMCH is transmitted through the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Furthermore, for a terminal apparatus that supports Carrier Aggregation (CA), the base station apparatus can integrate, for a broader band transmission, multiple Component Carriers (CCs) to perform communication. In carrier aggregation, one Primary Cell (PCell) and one or more Secondary Cells (SCells) are configured as a set of serving cells.

Furthermore, in Dual Connectivity (DC), a Master Cell Group (MCG) and a Secondary Cell Group (SCG) are configured as a group of serving cells. MCG includes a PCell and optionally one or more SCells. Furthermore, SCG includes a primary SCell (PSCell) and optionally one or more SCells.

The base station apparatus can communicate by using a radio frame. The radio frame includes multiple subframes (sub-periods), In a case that a frame length is expressed in time, for example, a radio frame length can be 10 milliseconds (ms), and a subframe length can be 1 ms. In this example, the radio frame includes 10 subframes.

Furthermore, the slot includes 14 OFDM symbols. Since the OFDM symbol length may vary depending on a subcarrier spacing, the slot length may also vary depending on the subcarrier spacing. Furthermore, a mini-slot may include the smaller number of OFDM symbols than that of the slot. The slot/mini-slot can be used as a scheduling unit. Note that the terminal apparatus can recognize slot based scheduling/mini-slot based scheduling by the position (mapping) of the first downlink DMRS. In the slot based scheduling, the first downlink DMRS is mapped on the third or fourth symbol of the slot. Furthermore, in the mini-slot-based scheduling, the first downlink DMRS is mapped on the first symbol of the scheduled data (resource, PDSCH).

Furthermore, the resource block is also defined by 12 contiguous subcarriers. Furthermore, the resource element is defined by an index of the frequency domain (e.g., subcarrier index) and an index of the time domain (e.g., OFDM symbol index). The resource element is classified as an uplink resource element, a downlink element, a flexible resource element, and a reserved resource element. In the reserved resource element, the terminal apparatus does not transmit an uplink signal and does not receive a downlink signal.

Furthermore, multiple Subcarrier spacings (SCS) are supported. For example, the SCS is 15/30/60/120/240/480 kHz.

The base station apparatus/terminal apparatus can communicate in a licensed band or an unlicensed band. The base station apparatus/terminal apparatus in which the licensed band is applied to the PCell can communicate with at least one SCell which operates in the unlicensed band through carrier aggregation. Furthermore, the base station apparatus/terminal apparatus can communicate through dual connectivity in which the master cell group communicates in the licensed band and the secondary cell group communicates in the unlicensed band. Furthermore, the base station apparatus/terminal apparatus can communicate only by the PCell in the unlicensed band. Furthermore, the base station apparatus/terminal apparatus can communicate through the CA or the DC only in the unlicensed band. Note that communication in which the licensed band is the PCell, and the unlicensed band cells (SCell, PSCell) are assisted by, for example, the CA, the DC, or the like, is also referred to as Licensed-Assisted Access (LAA). Furthermore, the communication by the base station apparatus/terminal apparatus only in the unlicensed band is also referred to as Unlicensed-standalone access (ULSA). Furthermore, the communication by the base station apparatus/terminal apparatus only in the licensed band is also referred to as Licensed Access (LA).

Figure 2:
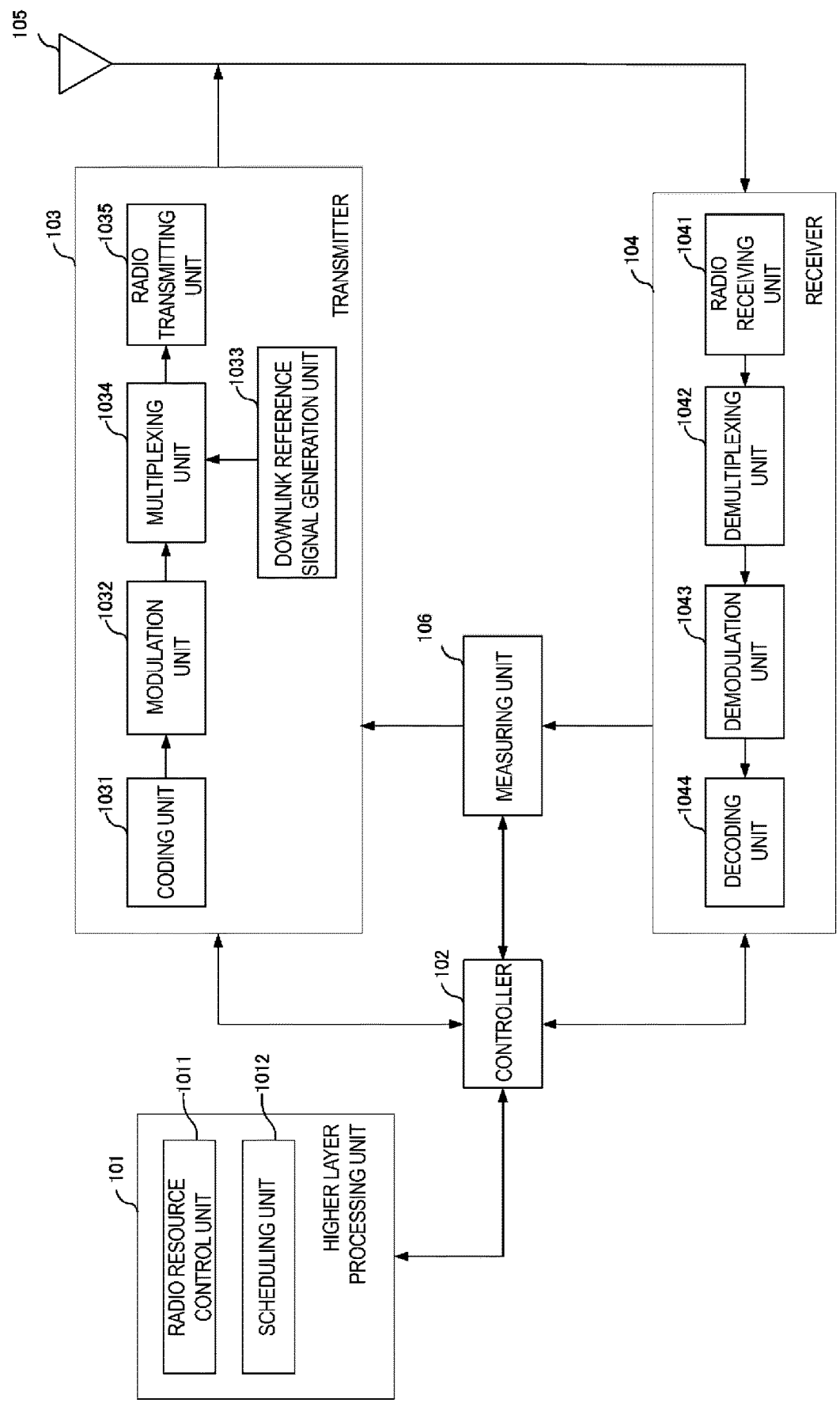
FIG. 2 is a block diagram illustrating a configuration example of a base station apparatus according to the present embodiment.

FIG. 2 is a schematic block diagram illustrating a configuration of the base station apparatus according to the present embodiment. As illustrated in FIG. 2, the base station apparatus is configured to include a higher layer processing unit (higher layer processing step) 101, a controller (controlling step) 102, a transmitter (transmitting step) 103, a receiver (receiving step) 104, a transmit and/or receive antenna 105, and a measuring unit (measuring step) 106. The higher layer processing unit 101 is configured to include a radio resource control unit (radio resource controlling step) 1011 and a scheduling unit (scheduling step) 1012. The transmitter 103 is configured to include a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 is configured to include a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the terminal apparatus transmits information (parameters) for indicating whether the prescribed function is supported. In a case that a terminal apparatus does not support a prescribed function, the terminal apparatus does not transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The radio resource control unit 1011 generates, or acquires from a higher node, the downlink data (the transport block) allocated in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2A through the transmit and/or receive antenna 105.

The coding unit 1031 codes the HARQ indicator, the downlink control information, and the downlink data that are input from the higher layer processing unit 101, in compliance with a predetermined coding scheme, such as block coding, convolutional coding, turbo coding, Low density parity check (LDPC) coding, Polar coding, or the like, or in compliance with a coding scheme determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like, generates an OFDM symbol, adds a Cyclic Prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission. The transmit power is based on information configured via the controller 102.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) of the signal from which the CP has been removed, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and uplink reference signal. The demultiplexing is performed based on radio resource allocation information, included in the uplink grant notified to each of the terminal apparatuses 2A, that is predetermined by the base station apparatus 1A by using the radio resource control unit 1011.

Furthermore, the demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, acquires modulation symbols, and demodulates, for each of the modulation symbols of PUCCH and PUSCH, a reception signal in compliance with a predetermined modulation scheme, such as BPSK, QPSK, 16QAM, 64QAM, and 256QAM, or in compliance with a modulation scheme that the base station apparatus 1A notified the terminal apparatus 2A in advance by using the uplink grant.

The decoding unit 1044 decodes the coded bits of PUCCH and PUSCH that have been demodulated, at a coding rate, in compliance with a predetermined coding scheme, that is predetermined or notified from the base station apparatus 1A to the terminal apparatus 2A in advance by using the uplink grant, and outputs the decoded uplink data and uplink control information to the higher layer processing unit 101, In a case that PUSCH is retransmitted, the decoding unit 1044 performs the decoding by using the coded bits that is input from the higher layer processing unit 101 and retained in an HARQ buffer, and the demodulated coded bits.

The measuring unit 106 observes the reception signal, and obtains various measurement values such as the RSRP/RSRQ/RSSI. Furthermore, the measuring unit 106 obtains received power, reception quality, and a preferable SRS resource index from the SRS transmitted from the terminal apparatus.

Figure 3:
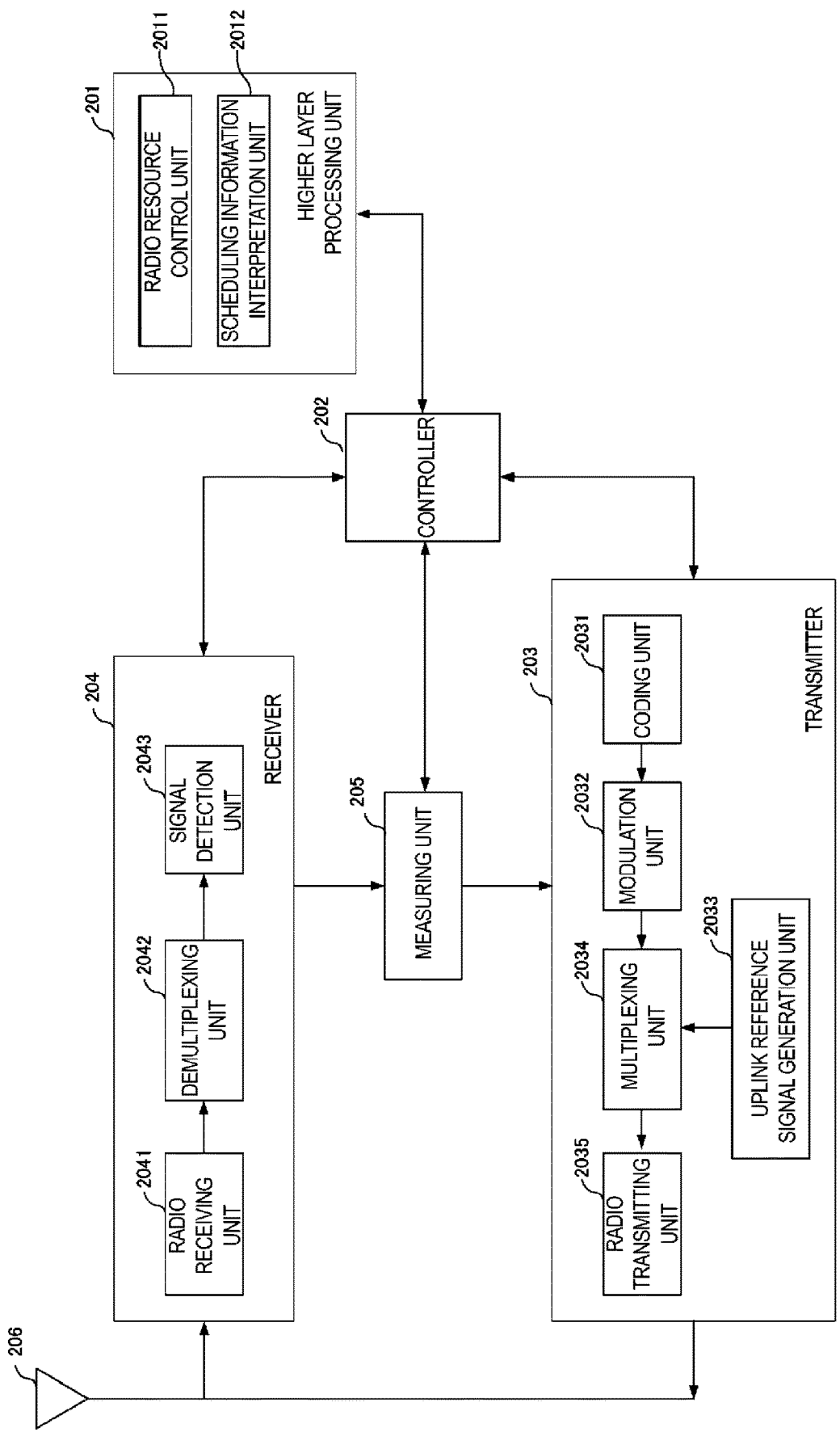
FIG. 3 is a block diagram illustrating a configuration example of a terminal apparatus according to the present embodiment.

FIG. 3 is a schematic block diagram illustrating a configuration of the terminal apparatus according to the present embodiment. As illustrated in FIG. 3, the terminal apparatus is configured to include a higher layer processing unit (higher layer processing step) 201, a controller (controlling step) 202, a transmitter (transmitting step) 203, a receiver (receiving step) 204, a measuring unit (measuring step) 205, and a transmit and/or receive antenna 206. The higher layer processing unit 201 is configured to include a radio resource control unit (radio resource controlling stop) 2011 and a scheduling information interpretation unit (scheduling information interpreting step) 2012. The transmitter 203 is configured to include a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 is configured to include a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus 2A, Furthermore, the radio resource control unit 2011 manages various configuration information of the terminal apparatuses 2A. Furthermore, the radio resource control unit 2011 generates information to be mapped to each uplink channel, and outputs the generated information to the transmitter 203.

The radio resource control unit 2011 acquires configuration information transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

Based on the information input, from the higher layer processing unit 201, the controller 202 generates a control signal for controlling the receiver 204, the measuring unit 205, and the transmitter 203. The controller 202 outputs the generated control signal to the receiver 204, the measuring unit 205, and the transmitter 203 to control the receiver 204 and the transmitter 203.

The controller 202 controls the transmitter 203 to transmit the CSI/RSRP/RSRQ/RSSI generated by the measuring unit 205 to the base station apparatus.

In accordance with the control signal input from the controller 202, the receiver 204 demultiplexes, demodulates, and decodes a reception signal received from the base station apparatus through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain.

The demultiplexing unit 2042 demultiplexes the extracted signal into PHICH, PDCCH, EPDCCH, PDSCH, and the downlink reference signal. Furthermore, the demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043, by using PDSCH and the channel estimation value, detects a signal, and outputs the detected signal to the higher layer processing unit 201.

The measuring unit 205 performs various measurements such as a CSI measurement, a Radio Resource Management (RRM) measurement, a Radio Link Monitoring (RLM) measurement, and the like, and obtains the CSI/RSRP/RSRQ/RSSI, and the like.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus through the transmit and/or receive antenna 206.

The coding unit 2031 codes the uplink control information or uplink data input from the higher layer processing unit 201 in compliance with a coding scheme such as convolutional coding, block coding, turbo coding, LDPC coding, Polar coding, or the like.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence determined according to a predetermined rule (formula), based on a physical cell identity (also referred to as a PCI, a cell ID, or the like) for identifying the base station apparatus, a bandwidth in which the uplink reference signal is mapped, a cyclic shift notified with the uplink grant, a parameter value for generation of a DMRS sequence, and the like.

The multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmitting unit 2035 performs Inverse Fast Fourier Transform (IFFT) on a signal resulting from the multiplexing, performs the modulation of OFDM scheme, generates an OFDMA symbol, adds CP to the generated OFDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

Note that the terminal apparatus can perform modulation according to not only the OFDMA scheme but also the SC-FDMA scheme.

In a case that ultra-large capacity communication, such as ultra-high definition video transmission or the like, is required, ultra-broadband transmission utilizing a high frequency band is desired. In transmission in the high frequency band, compensation of path loss is required and beamforming is important. Furthermore, in an environment in which multiple terminal apparatuses are present in a limited area, in a case that ultra-large capacity communication is required for each terminal apparatus, an Ultra-dense network in which base station apparatuses are deployed in high density is effective. However, in a case that the base station apparatuses are deployed in high density, a Signal to Noise power Ratio (SNR) greatly improves, but there is a possibility that strong interference due to beamforming arrives. Accordingly, in order to achieve ultra-large capacity communication in all terminal apparatuses in the limited area, interference control (avoidance, suppression, cancellation) in consideration of beamforming, and/or cooperative communication of multiple base stations is necessary.

Figure 4:
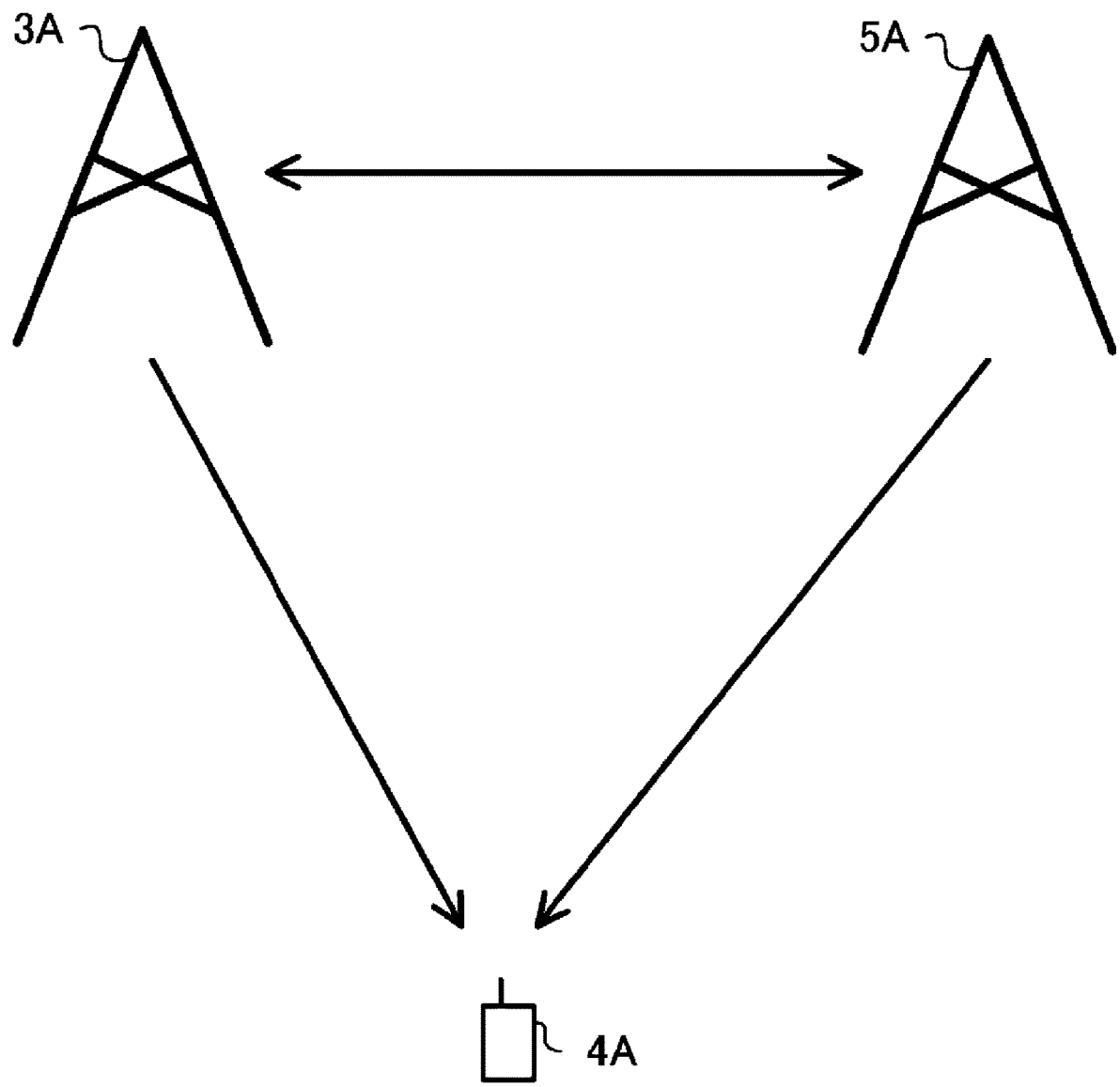
FIG. 4 is a diagram illustrating an example of a communication system according to the present embodiment.

FIG. 4 illustrates an example of a downlink communication system according to the present embodiment. The communication system illustrated in FIG. 4 includes a base station apparatus 3A, a base station apparatus 5A, and a terminal apparatus 4A. The terminal apparatus 4A can take the base station apparatus 3A and/or the base station apparatus 5A as a serving cell. Furthermore, in a case that the base station apparatus 3A or the base station apparatus 5A includes many antennas, the many antennas can be divided into multiple sub-arrays (panels, sub-panels), and transmission/reception beamforming can be applied for each sub-array. In this case, each sub-array can include a communication apparatus, and the configuration of the communication apparatus is the same as the base station apparatus configuration illustrated in FIG. 2, unless otherwise indicated. Furthermore, in a case that the terminal apparatus 4A includes multiple antennas, the terminal apparatus 4A can transmit or receive by beamforming. Furthermore, in a case that the terminal apparatus 4A includes many antennas, the many antennas can be divided into multiple sub-arrays (panels, sub-panels), and different transmission/reception beamforming can be applied for each sub-array. Each sub-array can include a communication apparatus, and the configuration of the communication apparatus is the same as the terminal apparatus configuration illustrated in FIG. 3, unless otherwise indicated. Note that each of the base station apparatus 3A and the base station apparatus 5A is also simply referred to as a base station apparatus. Note that the terminal apparatus 4A is also simply referred to as a terminal apparatus.

A synchronization signal is used to determine a preferable transmission beam of the base station apparatus, and a preferable reception beam of the terminal apparatus. The base station apparatus transmits a synchronization signal block (SS block, SSB) including the PSS, the PBCH, and the SSS. Note that in a synchronization signal block burst set periodicity configured by the base station apparatus, one or multiple synchronization signal blocks are transmitted to the time domain, and a time index is configured for each synchronization signal block. The terminal apparatus may consider that synchronization signal blocks with the same time index within the synchronization signal block burst set periodicity have been transmitted from the same location to some extent (quasi co-located (QCL)) where delay spread, Doppler spread, Doppler shift, an average gain, an average delay, a spatial reception parameter, and/or a spatial transmission parameter can be considered to be the same. Note that the spatial reception parameter is, for example, a spatial correlation of a channel, an Angle of Arrival, and the like. Furthermore, the spatial transmission parameter is, for example, a spatial correlation of a channel, an Angle of Departure, and the like. That is, the terminal apparatus can assume that the synchronization signal blocks with the same time index within the synchronization signal block burst set periodicity have been transmitted on the same transmission beam, and that synchronization signal blocks with different time indexes have been transmitted on different beams. Accordingly, in a case that the terminal apparatus reports, to the base station apparatus, information indicating a time index of a preferable synchronization signal block within the synchronization signal block burst set periodicity, the base station apparatus can recognize a transmission beam preferable for the terminal apparatus. Furthermore, the terminal apparatus can obtain a reception beam preferable for the terminal apparatus using synchronization signal blocks with the same time index in different synchronization signal block burst set periodicities. Accordingly, the terminal apparatus can associate the time index of the synchronization signal block and the reception beam direction and/or the sub-array. Note that in a case that multiple sub-arrays are included, the terminal apparatus may use a different sub-array in a case of connecting with a different cell.

In addition, the CSI-RS can be used to determine a preferable transmission beam of the base station apparatus and a preferable reception beam of the terminal apparatus. The base station apparatus can configure configuration information by a higher layer signaling. For example, the configuration information includes part or all of a resource configuration and a reporting configuration.

The resource configuration includes a resource configuration ID, a resource configuration type, and/or one or multiple CSI-RS resource set configurations. The resource configuration ID is used to identify the resource configuration. The resource configuration type indicates an operation of the resource configuration in the time domain. Specifically, it indicates whether the resource configuration is a configuration in which the CSI-RS is aperiodically transmitted, a configuration in which the CSI-RS is periodically transmitted, or a configuration in which the CSI-RS is semi-persistently transmitted. The CSI-RS resource set configuration includes a CSI-RS resource set configuration ID and/or one or multiple CSI-RS resource configurations. The CSI-RS resource set configuration ID is used to identify the CSI-RS resource set configuration. The CSI-RS resource configuration includes some or all of a CSI-RS resource configuration ID, a resource configuration type, the number of antenna ports, CSI-RS resource mapping, and a power offset of the CSI-RS and the PDSCH. The CSI-RS resource configuration ID is used to identify the CSI-RS resource configuration, and the CSI-RS resource is associated therewith by the CSI-RS resource configuration ID. The CSI-RS resource mapping indicates a resource element (OFDM symbol, subcarrier) on which the CSI-RS in the slot is mapped.

The resource configuration is used for CSI measurement or RRM measurement. The terminal apparatus receives the CSI-RS on the configured resource, calculates CSI from the CSI-RS, and reports the result to the base station apparatus. Furthermore, in a case that the CSI-RS resource set configuration includes multiple CSI-RS resource configurations, the terminal apparatus receives the CSI-RSs on the same reception beam on respective CSI-RS resources and calculates a CRI. For example, in a case that the CSI-RS resource set configuration includes K (K is an integer of 2 or greater) CSI-RS resource configurations, the CRI indicates preferable N CSI-RS resources from K CSI-RS resources. Note that N is a positive integer less than K. Furthermore, in a case that the CRI indicates multiple CSI-RS resources, the terminal apparatus can report CSI-RSRP measured by each CSI-RS resource to the base station apparatus in order to indicate which CSI-RS resource has good quality. The base station apparatus can recognize a transmission beam direction of the base station apparatus preferable for the terminal apparatus by the CRI reported from the terminal apparatus, by performing beamforming (precoding) on the CSI-RSs in respective different beam directions on the multiple configured CSI-RS resources and transmitting. On the other hand, the preferable reception beam direction of the terminal apparatus can be determined by using the CSI-RS resource in which the transmission beam of the base station apparatus is fixed. For example, the base station apparatus transmits, to a certain CSI-RS resource, information indicating whether or not a transmission beam of the base station apparatus is fixed, and/or a period in which the transmission beam is fixed. The terminal apparatus can obtain a preferable reception beam direction from the CSI-RSs received in respective different reception beam directions, in the CSI-RS resource in which the transmission beam is fixed. Note that the terminal apparatus may report the CSI-RSRP after determining the preferable reception beam direction. Note that in a case that the terminal apparatus includes multiple sub-arrays, the terminal apparatus can select a preferable sub-array at the time of obtaining the preferable reception beam direction. Note that the preferable reception beam direction of the terminal apparatus may be associated with the CRI. Furthermore, in a case that the terminal apparatus reports multiple CRIs, the base station apparatus can fix the transmission beam in the CSI-RS resource associated with each CRI. At this time, the terminal apparatus can determine the preferable reception beam direction for each CRI. For example, the base station apparatus can associate a downlink signal/channel and the CRI with each other and perform transmission. At this time, it is necessary for the terminal apparatus to perform reception on the reception beam associated with the CRI. Furthermore, in the configured multiple CSI-RS resources, a different base station apparatus can transmit the CSI-RS. In this case, it is possible for the network side to recognize which base station apparatus has good communication quality by the CRI. Furthermore, in a case that the terminal apparatus includes multiple sub-arrays, it is possible to perform reception through the multiple sub-arrays at the same timing. Accordingly, in a case that the base station apparatus transmits multiple layers (codeword, transport block) while associating the CRI with each layer by the downlink control information or the like, the terminal apparatus can receive the multiple layers using a sub-array corresponding to each CRI and a reception beam. However, in a case that an analog beam is used and that two CRIs corresponding to one sub-array of the terminal apparatus are simultaneously configured at a time when the number of reception beam directions used at the same timing in one sub-array is one, there is a possibility that the terminal apparatus cannot perform reception by multiple reception beams. In order to avoid this problem, for example, the base station apparatus divides the configured multiple CSI-RS resources into groups, and obtains the CRI using the same sub-array in a group. In addition, in a case that different sub-arrays among groups are used, the base station apparatus can recognize multiple CRIs that can be configured at the same timing. Note that the group of CSI-RS resources may be a CSI-RS resource set. Note that the CRIs that can be configured at the same timing may be considered to be QCL. At this time, the terminal apparatus can transmit the CRI in association with the QCL information. For example, in a case that the terminal apparatus distinguishes a CRI that is QCL and a CRI that is not QCL to report, it is possible for the base station apparatus not to configure the CRIs that are QCL at the same timing, and configure the CRTs that are not QCL at the same timing. Furthermore, the base station apparatus may request the CSI for each sub-array of the terminal apparatus. In this case, the terminal apparatus reports the CSI for each sub-array. Note that in a case that the terminal apparatus reports multiple CRIs to the base station apparatus, only the CRI that is not QCL may be reported.

The reporting configuration is a configuration related to a CSI report, and includes a reporting configuration ID, a reporting configuration type, and/or a report value (amount). The reporting configuration ID is used to identify the reporting configuration. The report value (amount) is a CSI value (amount) to be reported. The reporting configuration type indicates that the reporting configuration is a configuration in which the CSI value (amount) is aperiodically reported, a configuration in which the CSI value (amount) is periodically reported, or a configuration in which the CSI value (amount) is semi-persistently reported.

Furthermore, in order to determine a preferable transmission beam of the base station apparatus, a codebook is used in which candidates for a prescribed precoding (beamforming) matrix (vector) are defined. The base station apparatus transmits the CSI-RS, the terminal apparatus obtains a preferable precoding (beamforming) matrix from the codebook, and reports the result as a PMI to the base station apparatus. With this, the base station apparatus can recognize a transmission beam direction preferable for the terminal apparatus. Note that the codebook includes a precoding (beamforming) matrix for synthesizing antenna ports and a preceding (beamforming) matrix for selecting an antenna port. In a case that the codebook for selecting the antenna port is used, the base station apparatus can use different transmission beam directions for the respective antenna ports. Accordingly, in a case that the terminal apparatus reports a preferable antenna port as the PMI, the base station apparatus can recognize a preferable transmission beam direction. Note that a preferable reception beam of the terminal apparatus may be the reception beam direction associated with the CRI, or a preferable reception beam direction may be determined again. In a case that the codebook for selecting the antenna port is used and that the preferable reception beam direction of the terminal apparatus is considered to be the reception beam direction associated with the CRI, for the reception beam direction for receiving the CSI-RS, it is desirable that the reception be performed in the reception beam direction associated with the CRI. Note that even in a case that the reception beam direction associated with the CRI is used, the terminal apparatus can associate the PMI and the reception beam direction with each other. Additionally, in a case that the codebook for selecting the antenna port is used, the antenna ports may be respectively subjected to transmissions from different base station apparatuses (cells). In this case, in a case that the terminal apparatus reports the PMI, the base station apparatus can recognize which base station apparatus (cell) communication quality is preferable. Note that in this case, the antenna ports of different base station apparatuses (cells) can be made not to be QCL.

The terminal apparatus 4A has a possibility to receive an interference signal from a neighbor cell (neighbor cell interference) in addition to the serving cell. The interference signal is the PDSCH, the PDCCH, or a reference signal of the neighbor cell. In this case, cancellation or suppression of the interference signal in the terminal apparatus is effective. As a scheme for cancelling or suppressing the interference signal, it is possible to apply Enhanced-Minimum Mean Square Error (E-MMSE) in which a channel of the interference signal is estimated and suppression by linear weight is performed, an interference canceler in which a replica of the interference signal is generated and cancellation is performed, Maximum Likelihood Detection (MLD) in which all transmission signal candidates of a desired signal and the interference signal are retrieved and the desired signal is detected, Reduced complexity-MLD (R-MLD) in which a lower computation amount than the MLD is achieved by reducing the transmission signal candidates, or the like. In order to apply these schemes, channel estimation of the interference signal, demodulation of the interference signal, or decoding of the interference signal is required. Therefore, in order to efficiently cancel or suppress the interference signal, the terminal apparatus needs to recognize a parameter of the interference signal (neighbor cell). Accordingly, in order to assist in the cancellation or suppression of the interference signal by the terminal apparatus, the base station apparatus can transmit (configure) assistance information including the parameter of the interference signal (neighbor cell) to the terminal apparatus. One or multiple pieces of assistance information are configured. The assistance information includes, for example, some or all of a physical cell ID, a virtual cell ID, a power ratio (power offset) between the reference signal and the PDSCH, a scrambling identity of the reference signal, quasi co-location information (QCL information), a CSI-RS resource configuration, the number of CSI-RS antenna ports, subcarrier spacing, resource allocation granularity, resource allocation information, a DMRS configuration, a DMRS antenna port number, the number of layers, a TDD DL/UL configuration, a PMI, an RI, a modulation scheme, and a Modulation and Coding Scheme (MCS). Note that the virtual cell ID is an ID virtually allocated to a cell, and there may be cells with the same physical cell ID and the different virtual cell IDs. The QCL information is information about QCL for a prescribed antenna port, a prescribed signal, or a prescribed channel. In a case that long term performance of a channel on which a symbol on an antenna port is carried can be estimated from a channel on which a symbol on another antenna port is carried, the two antenna ports are said to be Quasi Co-Located (QCL). The long term performance includes delay spread, Doppler spread, Doppler shift, an average gain, an average delay, a spatial reception parameter, and/or a spatial transmission parameter. In other words, in a case that two antenna ports are Quasi Co-Located (QCL), the terminal apparatus can consider the two antenna ports to have the same long term performance. The subcarrier spacing indicates subcarrier spacing of the interference signal or a candidate of subcarrier spacing that may be used in the band. Note that in a case that the subcarrier spacing included in the assistance information and the subcarrier spacing used in the communication with the serving cell are different, the terminal apparatus may not cancel or suppress the interference signal. The candidate of subcarrier spacing that may be used in the band may indicate subcarrier spacing that is normally used. For example, the normally used subcarrier spacing may not include a low frequency subcarrier spacing used for high reliability and low latency communication (emergency communication). The resource allocation granularity indicates the number of resource blocks in which the preceding (beamforming) does not change. The DMRS configuration indicates a PDSCH mapping type and an additional mapping of the DMRS. The DMRS resource allocation varies depending on the PDSCH mapping type. For example, in a PDSCH mapping type A, the DMRS is mapped to a third symbol of the slot. Furthermore, for example, in a PDSCH mapping type B, mapping to a first OFDM symbol of the allocated PDSCH resource is performed. The additional mapping of the DMRS indicates whether or not additional DMRS mapping is performed, or mapping to be added. Note that some or all of the parameters included in the assistance information are transmitted (configured) by the higher layer signaling. Furthermore, some or all of the parameters included in the assistance information are transmitted by the downlink control information. Furthermore, in a case that each of the parameters included in the assistance information indicates multiple candidates, the terminal apparatus performs blind detection of a preferable one from among candidates. Furthermore, the parameter that is not included in the assistance information is blindly detected by the terminal apparatus.

In a case that the terminal apparatus performs communication using multiple reception beam directions, a surrounding interference situation greatly varies depending on the reception beam direction. For example, an interference signal that is strong in one reception beam direction may be weakened in another reception beam direction. The assistance information of a cell that has a low possibility to make strong interference not only is meaningless, but also has a possibility to cause wasteful calculation at the time of determining whether or not a strong interference signal is received. Accordingly, it is desirable that the assistance information be configured for each reception beam direction. However, since the base station apparatus does not necessarily recognize the reception direction of the terminal apparatus, information associated with the reception beam direction and the assistance information may be associated with each other. For example, since the terminal apparatus can associate the CRI and the reception beam direction with each other, the base station apparatus can transmit (configure) one or multiple pieces of assistance information for each CRI. Furthermore, since the terminal apparatus can associate the time index of the synchronization signal block and the reception beam direction with each other, the base station apparatus can transmit (configure) one or multiple pieces of assistance information for each time index of the synchronization signal block. Furthermore, since the terminal apparatus can associate the PMI (antenna port number) and the reception beam direction with each other, the base station apparatus can transmit (configure) one or multiple pieces of assistance information for each PMI (antenna port number). Furthermore, in a case that the terminal apparatus includes multiple sub-arrays, since there is a high possibility that the reception beam direction changes for each sub-array, the base station apparatus can transmit (configure) one or multiple pieces of assistance information for each index associated with the sub-array of the terminal apparatus. Furthermore, in a case that multiple base station apparatuses (transmission and/or reception points) and the terminal apparatus communicate, there is a high possibility that the terminal apparatus communicates with the respective base station apparatuses (transmission and/or reception points) in different reception beam directions. Accordingly, the base station apparatus transmits (configures) one or multiple pieces of assistance information for each information indicating the base station apparatus (transmission and/or reception point). The information indicating the base station apparatus (transmission and/or reception point) may be a physical cell ID or a virtual cell ID. Furthermore, in a case that different DMRS antenna port numbers are used for the respective base station apparatuses (transmission and/or reception points), information indicating the DMRS antenna port number and the DMRS antenna group becomes information indicating the base station apparatus (transmission and/or reception point).

Note that the common number of pieces of assistance information can be configured by the base station apparatus for each CRI. Here, the number of pieces of assistance information refers to the type of assistance information, the number of elements of each assistance information (e.g., the number of candidates for the cell ID), and the like. Furthermore, the number of pieces of assistance information configured by the base station apparatus for each CRI can be configured to have a maximum value, and the base station apparatus can configure the assistance information to each CRI within the range of the maximum value.

Note that in a case that the reception beam direction of the terminal apparatus changes, there is a high possibility that the transmit antenna is not QCL. Accordingly, the assistance information can be associated with the QCL information. For example, in a case that the base station apparatus transmits (configures) the assistance information of multiple cells, it is possible to indicate a cell being QCL (or a cell not being QCL) to the terminal apparatus.

Note that the terminal apparatus cancels or suppresses the interference signal using the assistance information associated with the CRI used for communication with the serving cell.

Furthermore, the base station apparatus may configure assistance information that is associated with the reception beam direction (CRI/time index of synchronization signal block/PMI/antenna port number/sub-array) and assistance information that is not associated with the reception beam direction (CRI/time index of synchronization signal block/PMI/antenna port number/sub-array). Furthermore, the assistance information that is associated with the reception beam direction and the assistance information that is not associated with the reception beam direction may be selectively used in capability and category of the terminal apparatus. The capability and category of the terminal apparatus may indicate whether or not the terminal apparatus supports reception beamforming. Furthermore, the assistance information that is associated with the reception beam direction and the assistance information that is not associated with the reception beam direction may be selectively used in a frequency band. For example, the base station apparatus does not configure the assistance information that is associated with the reception beam direction at a frequency lower than 6 GHz. Furthermore, for example, the base station apparatus configures the assistance information that is associated with the reception beam direction only at a frequency higher than 6 GHz.

Note that the CRI may be associated with a CSI resource set configuration ID. In a case of indicating the CRI to the terminal apparatus, the base station apparatus may indicate the CRI along with the CSI resource set configuration ID. Note that in a case that the CSI resource set configuration ID is associated with one CRI or one reception beam direction, the base station apparatus may configure the assistance information for each CSI resource set configuration ID.

The base station apparatus requests the terminal apparatus to perform neighbor cell measurement in order to recognize a neighbor cell associated with the reception beam direction of the terminal apparatus. The neighbor cell measurement request includes information associated with the reception beam direction of the terminal apparatus and a cell ID. In a case of receiving the neighbor cell measurement request, the terminal apparatus measures the RSRP/RSRQ/RSSI of the neighbor cell, and reports the measurement result to the base station apparatus together with information associated with the reception beam direction of the terminal apparatus. Note that the information associated with the reception beam direction of the terminal apparatus is information indicating the CRI, the time index of the synchronization signal block, the sub-array of the terminal apparatus, or the base station apparatus (transmission and/or reception point).

Furthermore, in a case that the terminal apparatus moves, there is a possibility that the surrounding environment changes every moment. Accordingly, it is desirable for the terminal apparatus to observe surrounding channel situations, interference situations, and the like at a prescribed timing and report the result to the base station apparatus. The report result is reported by a periodic report or a report by an event. In the case of the periodic report, the terminal apparatus periodically measures the synchronization signal or the RSRP/RSRQ by the CSI-RS and reports the result. In the case of the report by the event, an event ID and a condition related to the report are associated with each other. The event ID includes those as described below, for example, and a threshold required to calculate a condition (in a case that there is necessity, a threshold 1, a threshold 2), and an offset value are also configured.

Event A1: A case that a measurement result of the serving cell is better than a configured threshold.

Event A2: A case that a measurement result of the serving cell is worse than a configured threshold.

Event A3: A case that a measurement result of the neighbor cell is better than a measurement result of the PCell/PSCell by a configured offset value or more.

Event A4: A case that a measurement result of the neighbor cell is better than a configured threshold.

Event A5: A case that a measurement result of the PCell/PSCell is worse than a configured threshold 1, and a measurement result of the neighbor cell is better than a configured threshold 2.

Event A6: A case that a measurement result of the neighbor cell is better than a measurement result of the SCell by a configured offset value or more.

Event C1: A case that a measurement result at the CSI-RS resource is better than a configured threshold.

Event C2: A case that a measurement result at the CSI-RS resource is better than a measurement result at a configured reference CSI-RS resource by an offset amount or more.

Event D1: A case that a measurement result of the CSI-RS resource that is different from the CRI is better than a configured threshold.

Event D2: A case that a measurement result of the CSI-RS resource that is associated with the CRI is worse than a configured threshold.

Event D3: A case that a measurement result of a reception beam direction that is not associated with the CRI is better than a configured threshold.

Event D4: A case that a measurement result of an SS block index that is used for synchronization is worse than a configured threshold.

Event D5: A case that a measurement result of an SS block index that is not used for synchronization is worse than a configured threshold.

Event E1: A case that time elapsed since the base station apparatus determines the beam exceeds a threshold. Event E2: A case that time elapsed since the terminal apparatus determines the beam exceeds a threshold.

In a case of reporting based on the reporting configuration, the terminal apparatus reports SS-RSRP/SS-RSRQ/CSI-RSRP/CSI-RSRQ/RSSI as a measurement result.

Figure 5:
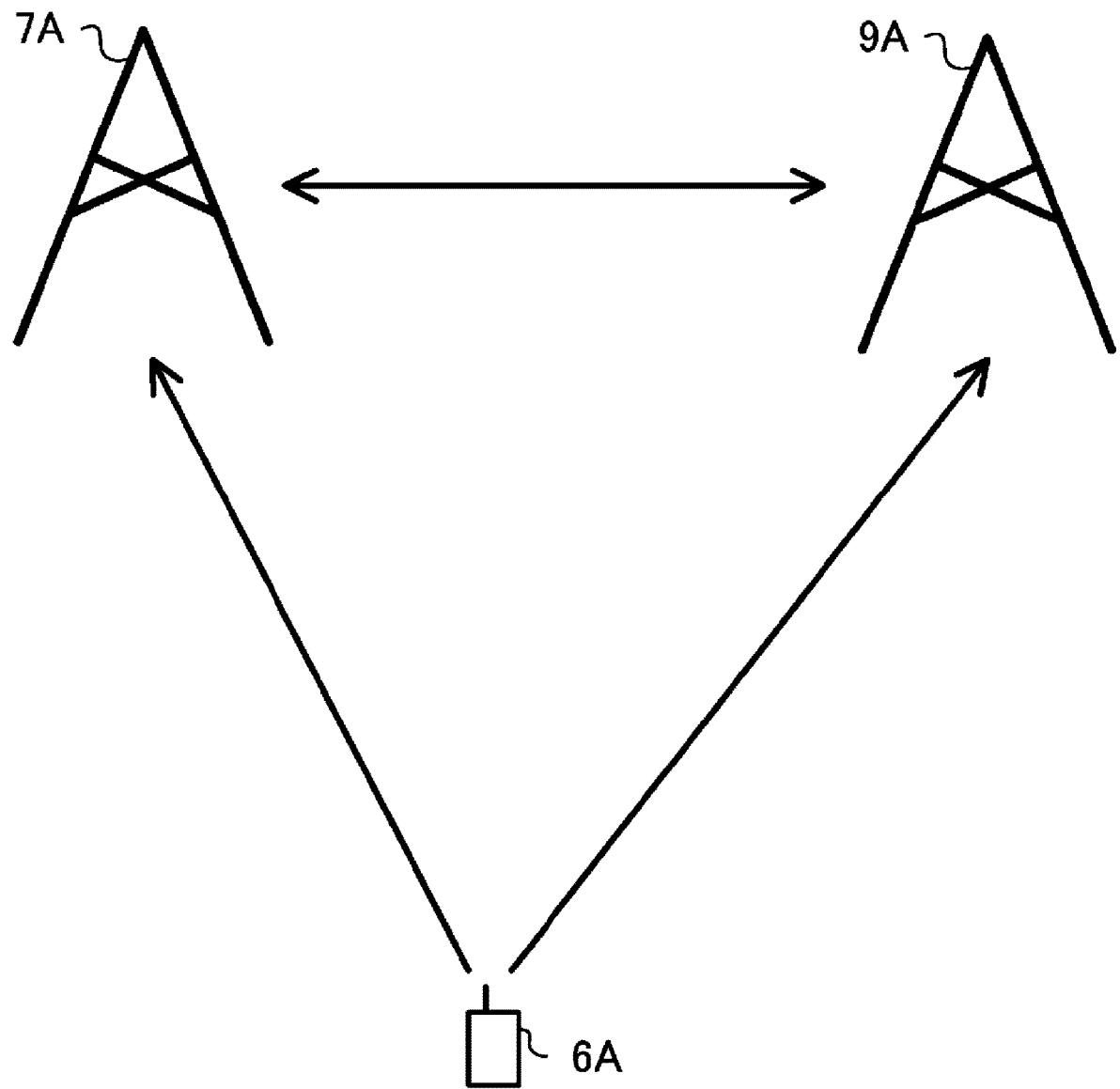
FIG. 5 is a diagram illustrating an example of a communication system according to the present embodiment.

FIG. 5 illustrates an example of an uplink communication system according to the present embodiment. The communication system illustrated in FIG. 5 includes a base station apparatus 7A, a base station apparatus 9A, and a terminal apparatus 6A. The terminal apparatus 6A can be served by the base station apparatus 7A and/or the base station apparatus 9A as a serving cell. Furthermore, in a case that the base station apparatus 7A or the base station apparatus 9A includes many antennas, the many antennas can be divided into multiple sub-arrays (panels, sub-panels), and transmission/reception beamforming can be applied for each sub-array. In this case, each sub-array can include a communication apparatus, and the configuration of the communication apparatus is the same as the base station apparatus configuration illustrated in FIG. 2, unless otherwise indicated. Furthermore, in a case that the terminal apparatus 6A includes multiple antennas, the terminal apparatus 6A can perform transmission or reception by beamforming. Furthermore, in a case that the terminal apparatus 6A includes many antennas, the many antennas can be divided into multiple sub-arrays (panels, sub-panels), and different transmission/reception beamforming can be applied for each sub-array. Each sub-array can include a communication apparatus, and the configuration of the communication apparatus is the same as the terminal apparatus configuration illustrated in FIG. 3, unless otherwise indicated. Note that each of the base station apparatus 7A and the base station apparatus 9A is also simply referred to as a base station apparatus. Note that the terminal apparatus 6A is also simply referred to as a terminal apparatus.

In uplink, an SRS is used to determine a preferable transmission beam of the terminal apparatus, and a preferable reception beam of the base station apparatus. The base station apparatus can transmit (configure) configuration information related to the SRS by a higher layer signaling. The configuration information includes one or multiple SRS resource set configurations. The SRS resource set configuration includes an SRS resource set configuration ID and/or one or multiple SRS resource configurations. The SRS resource set configuration ID is used to identify the SRS resource set configuration. The SRS resource configuration includes an SRS resource configuration ID, the number of SRS antenna ports, an SRS transmission Comb, SRS resource mapping, SRS frequency hopping, and an SRS resource configuration type. The SRS resource configuration ID is used to identify the SRS resource configuration. The SRS transmission comb indicates frequency intervals of a comb tooth-shaped spectrum and the positions (offsets) in the frequency intervals. The SRS resource mapping indicates an OFDM symbol position and the number of OFDM symbols into which the SRS is mapped in the slot. The SRS frequency hopping is information indicating the frequency hopping of the SRS. The SRS resource configuration type indicates an operation of the SRS resource configuration in the time domain. Specifically, it indicates whether the SRS resource configuration is a configuration in which the SKS is aperiodically transmitted, a configuration in which the SRS is periodically transmitted, or a configuration in which the SRS is semi-persistently transmitted.

In a case that multiple SRS resources are configured and that the terminal apparatus performs transmission in different transmission beam directions for the respective SRS resources, the base station apparatus can determine a preferable SRS resource. In a case that the base station apparatus transmits (indicates), to the terminal apparatus, an SRS Resource Indicator (SRI) that is information indicating the SRS resource, the terminal apparatus can recognize that the transmission beam direction in the transmission of the SRS resource is preferable. Note that in order to obtain a preferable reception beam for the base station apparatus, the base station apparatus can request the terminal apparatus to perform transmission by the same transmission beam for a prescribed period. The terminal apparatus performs transmission, in accordance with a request from the base station apparatus, for the indicated period, by the indicated SRS resource, and in the same transmission beam direction as that transmitted by using the indicated SRI.

In a case of including multiple sub-arrays, the terminal apparatus can communicate with multiple base station apparatuses (transmission and/or reception points). In the example in FIG. 5, the terminal apparatus 6A can be served by the base station apparatus 7A and the base station apparatus 9A as serving cells. In this case, there is a high possibility that, for the terminal apparatus 6A, a preferable transmission beam direction for communication with the base station apparatus 7A and a preferable transmission beam direction for communication with the base station apparatus 9A are different. Accordingly, in a case of performing transmissions by different sub-arrays in different transmission beam directions, respectively, the terminal apparatus 6A can communicate with the base station apparatus 7A and the base station apparatus 9A at the same timing.

In a case of transmitting the SRS on a certain SRS resource by using the multiple antenna ports, the terminal apparatus can use different transmission beam directions for the respective antenna ports. In this case, in a case that the base station apparatus indicates transmission at a preferable antenna port number to the terminal apparatus, the terminal apparatus can recognize a preferable transmission beam direction. Note that the base station apparatus can also indicate a transmission PMI (TPMI) to the terminal apparatus by using a codebook for selecting the antenna port. The base station apparatus can indicate, to the terminal apparatus, which codebook is to be referenced. The terminal apparatus can use the transmission beam direction corresponding to the antenna port number indicated by the TPMI, with reference to the indicated codebook.

In a case that the terminal apparatus has multiple sub-arrays and can perform transmission by using multiple sub-arrays at the same timing, the terminal apparatus can assign different antenna port numbers among sub-arrays. At this time, in a case that the terminal apparatus transmits the SRS from an antenna port of a different sub-array by using the transmission beam and receives the TPMI from the base station apparatus, the terminal apparatus can recognize a preferable sub-array and a transmission beam direction. Accordingly, the terminal apparatus can associate the TPMI with the sub-array and the transmission beam direction.

Note that in a case of communicating with multiple base station apparatuses (transmission and/or reception points), the terminal apparatus can transmit the same signal (data), and can transmit different signals (data), to the respective base station apparatuses (transmission and/or reception points). In a case that the terminal apparatus communicates with multiple base station apparatuses (transmission and/or reception points) using the same signal (data), since it is possible to improve reception quality by combining the signals received by the multiple base station apparatuses (transmission and/or reception points), it is desirable for the multiple base station apparatuses (transmission and/or reception points) to cooperate and perform reception processing.

The base station apparatus can use DCI for scheduling of the PUSCH. In a case that the terminal apparatus communicates with multiple base station apparatuses, each base station apparatus can transmit the DCI for scheduling of the PUSCH. The DCI includes the SRI and/or the TPMI, and the terminal apparatus can recognize a preferable transmission beam for the base station apparatus. Furthermore, in a case that the terminal apparatus communicates with multiple base station apparatuses, it is possible to transmit the PUSCH to the multiple base station apparatuses by DCI from one base station apparatus. For example, in a case that the DCI includes control information for multiple layers (codeword, transport block), and the SRI and/or the TPMI is indicated (configured) for each layer, each layer is transmitted by a preferable transmission beam for each base station apparatus. In this way, in a case that one piece of DCI is received, the terminal apparatus can transmit different signals (data) to the multiple base station apparatuses, respectively. Furthermore, in a case that the DCI includes control information of one layer and multiple SRIs and/or TPMIs are indicated (configured) for one layer, the terminal apparatus transmits one layer (the same data) using different transmission beams. In this way, in a case that one piece of DCI is received, the terminal apparatus can transmit the same signal (data) to the multiple base station apparatuses.

In a case that the terminal apparatus performs transmission to multiple base station apparatuses at the same timing, each base station apparatus desirably recognizes communication quality with the terminal apparatus at the same timing. Accordingly, the base station apparatus can indicate (trigger) multiple SRIs and SRS resources corresponding to the respective SRIs by one piece of DCI. In other words, in a case that the terminal apparatus transmits SRSs in the transmission beam directions corresponding to the respective SRIs at the same timing, each base station apparatuses can recognize the communication quality with the terminal apparatus at the same timing.

In a case that the sub-array included in the terminal apparatus can use only one transmission beam direction at the same timing, transmission to multiple base station apparatuses by different sub-arrays at the same timing is performed. At this time, in a case that two SRIs are indicated (configured) by one piece of DCI from the base station apparatus and that the two SRIs are associated with the same sub-array, there is a possibility that the terminal apparatus cannot perform transmissions corresponding to the two SRIs at the same timing. In order to avoid this problem, for example, the base station apparatus can configure the multiple SRS resources to be divided into groups, and request the terminal apparatus to transmit the SRS by using the same sub-array in one group. In addition, in a case that different sub-arrays between groups are used, the base station apparatus can recognize multiple SRIs that can be configured at the same timing Note that the group of SRS resources may be an SRS resource set. Note that the SRSs (SRS resources) that can be configured at the same timing may be considered not to be QCL. At this time, the terminal apparatus can transmit the SRS in association with the QCL information. For example, in a case that the terminal apparatus distinguishes an SRS that is QCL and an SRS that is not QCL, and performs transmission, it is possible for the base station apparatus not to configure the SRIs that are QCL at the same timing, and configure the SRIs that are not QCL at the same timing. Furthermore, the base station apparatus may request the SRS for each sub-array of the terminal apparatus. In this case, the terminal apparatus transmits the SRS for each sub-array, Note that in a case that two SRIs that cannot be transmitted at the same timing are indicated to the terminal apparatus by the base station apparatus, the terminal apparatus can request a procedure of beam recovery for performing transmission beam selection again to the base station apparatus. The beam recovery procedure is a procedure performed in a case that tracking of the transmission and/or reception beam deviates between the terminal apparatus and the base station apparatus and the communication quality is significantly degraded, and the terminal apparatus needs to acquire a new connection destination (a transmission beam of the base station apparatus) beforehand. The terminal apparatus according to the present embodiment is in a state in which the transmission beam itself is reserved, but can use the procedure of beam recovery in order to resolve a state in which the two SRIs that cannot be transmitted at the same timing are configured.

The terminal apparatus according to the present embodiment can include multiple antennas (antenna panels) for each of which independent beamforming is configured. The terminal apparatus according to the present embodiment can use multiple antenna panels. As a matter of course, the terminal apparatus can switch and use the multiple antenna panels, but in a case that the selection of the antenna panel is not appropriately performed, transmission quality is significantly degraded particularly in high frequency transmission. Accordingly, in order to select beamforming configured for the antenna, the terminal apparatus can perform beam scanning (probing) with the base station apparatus. The terminal apparatus according to the present embodiment can transmit the SRS in order to perform the beam scanning.

The base station apparatus according to the present embodiment can notify the terminal apparatus of information indicating duality (relationship, reciprocity) related to downlink and uplink propagation (channel) performance. As information related to propagation performance, the base station apparatus can notify the terminal apparatus of information indicating Beam Correspondence (Spatial relation, Spatial relation information, and reception parameter). Here, the beam correspondence includes information indicating a relationship between reception beamforming (spatial domain reception filter, reception weight, reception parameter, reception spatial parameter) used by the terminal apparatus in a case that a downlink signal is received and transmission beamforming (spatial domain transmission fitter, transmission weight, transmission parameter, transmission spatial parameter) used in a case that an uplink signal is received.

The base station apparatus can configure the beam correspondence for each signal transmitted by the terminal apparatus. For example, the base station apparatus can notify the terminal apparatus of information indicating the beam correspondence to the SRS transmitted by the terminal apparatus. The base station apparatus can notify the terminal apparatus of SRS spatial relation information (SRS-SpatialRelationInfo). In a case that the SRS spatial relation information indicates a prescribed signal (value, state), the terminal apparatus can perform SRS transmission using beamforming associated with the prescribed signal. For example, in a case that the SRS spatial relation information specifies a synchronization signal (SSB and PBCH), the terminal apparatus can transmit the SRS using the reception beamforming used in a case that the synchronization signal is received. In the same manner, the base station apparatus can notify of spatial relation information related to other signals transmitted by the terminal apparatus (e.g., PUCCH/PUSCH/RS/RACH, and the like), or other signals received by the terminal apparatus (e.g., PDCCH/PDSCH/RS). In other words, the base station apparatus can notify the terminal apparatus of spatial relation information of a first signal and a second signal. In a case that the terminal apparatus receives the spatial relation information of the first signal and the second signal, and recognizes that the spatial relation of the spatial relation information is guaranteed between the first signal and the second signal, it is possible to transmit the second signal (or receive the second signal) using the reception parameter with which the first signal has been received (or the transmission parameter with which the first signal has been transmitted).

There are at least four QCL types described below, which are different in parameters thereof that can be considered to be the same. The base station apparatus and the terminal apparatus can configure any one of the following QCL types between antenna ports (or signals associated with the antenna port), and can also simultaneously configure multiple QCL types.

QCL type A: Doppler shift, Doppler spread, average delay, delay spread

QCL type B: Doppler shift, Doppler spread

QCL type C: Doppler shift, average delay

QCL type D: Spatial Rx

In a case that a PDSCH resource is scheduled using a downlink assignment, the terminal apparatus can configure reception beamforming for receiving the PDSCH. At this time, the terminal apparatus can acquire information associated with the reception beamforming from DCI in which the downlink assignment is described. For example, the terminal apparatus can acquire a transmission configuration indication (TCI) from the DCI. The TCI indicates information associated with the QCL related to the antenna port through which the PDSCH has been transmitted. The terminal apparatus can configure reception beamforming for receiving the PDSCH (or a DMRS associated with the PDSCH) by interpreting the TCI. For example, in the TCI, in a case that the SSB and the DMRS associated with the PDSCH are configured to be QCL with respect to the reception parameter, the terminal apparatus can use, for receiving the PDSCH, the reception beam used in a case that the SSB with the index fed back to the base station apparatus is received. Note that in a case that the acquisition of the DCI is not completed before the terminal apparatus starts reception of the PDSCH (before the frame including the PDSCH is received by the terminal apparatus) (in a case that a value of a scheduling offset indicating a time difference between the scheduling information and the PDSCH is less than a prescribed value), the terminal apparatus can receive the PDSCH in accordance with TCI default that is a default configuration. Note that the TCI-default is one of eight TCIs that are configured. Furthermore, in the case of receiving the PDCCH, the terminal apparatus can configure, the reception beamforming based on the configuration of the TCI default.

The communication apparatus according to the present embodiment (including the base station apparatus and the terminal apparatus) performs, in a case of transmitting at least some of signals transmitted by the device itself in an unlicensed band, prior to the signal transmission in the unlicensed band, carrier sense (Listen Before Talk (LBT), Clear Channel Assessment (CCA)) in the unlicensed band, and acquires channel occupancy time (or channel transmission permission time).

In a case of communication in the unlicensed band, in a case that the channel is determined to be idle and the carrier sense is successful, the base station apparatus/terminal apparatus can occupy the channel for a certain period. The maximum value of the period (channel occupancy period) in which the channel can be occupied is referred to as Maximum Channel Occupancy Time (MCOT). In addition, the MCOT changes depending on the priority of data. The priority of data may be expressed by a priority class (channel access priority class). The priority class is indicated by 1, 2, 3, and 4 in order of higher priority. Additionally, the maximum value of a random period required for the LBT may also change depending on the priority class. Note that the random period is a product of a random positive integer that is less than or equal to the contention window and a slot period (e.g., 9 microseconds). Furthermore, the random positive integer that is less than or equal to the content window size (CWS) is also referred to as a counter in the carrier sense (LBT). There is a possibility that the CWS changes depending on the priority class, a transmission error rate, and the like. In addition, in a case that observed (detected) power is less than an energy detection threshold value in at least a prescribed period (e.g., 4 microseconds) in the slot period, the slot period is considered to be idle. Otherwise, the slot period is considered to be busy. Then, the carrier sense is considered to be successful in a case that the idle state is obtained in slots of the number corresponding to the counter value. Note that the slot period may vary depending on a frequency band (frequency bandwidth, carrier frequency), and the slot period can be further shortened in a high frequency band. Furthermore, depending on the frequency band (frequency bandwidth, carrier frequency), the period for determining the idle/busy state may vary in slot units. That is, in a case of determination of the idle state, a period in which the observed (detected) power is less than the energy detection threshold value can be further shortened in the high frequency band.

The base station apparatus can use, in the carrier sense, the energy detection threshold value in order to determine whether or not other communication apparatuses are communicating. The base station apparatus can configure the energy detection threshold value so as to be less than or equal to the maximum energy detection threshold value. Since a beam gain is obtained in beamforming, in a case that beamforming is assumed, the beam gain can be taken into account in the energy detection threshold value. For example, an offset value X dB by beamforming can be configured to be the difference between the gain of a main beam and the gain of a side lobe. At this time, a threshold obtained by increasing the energy detection threshold value by X dB is the energy detection threshold value in consideration of the beam gain. Increasing the energy detection threshold value improves a probability of successful carrier sense, but since an area of a portion that gives interference narrows due to the beamforming, the possibility that interference power significantly increases is low. Note that in a case that the beamforming is not assumed or in a case that the beam pattern is formed in all directions, X is 0 dB. Note that the maximum value of the offset value X dB by beamforming can be configured to a different value depending on a frequency band (frequency bandwidth, carrier frequency) in which the base station apparatus 1A performs communication. Furthermore, the offset value X dB by beamforming may also be calculated based on Equivalent isotopically radiated power (EIRP) also including the transmit power of the base station apparatus 1A. Whether the base station apparatus 1A configures the offset value X dB by beamforming based on an antenna gain or configures it based on the EIRP can be determined depending on a frequency band (frequency bandwidth, carrier frequency) in which the base station apparatus 1A performs communication.

In a case that the communication apparatus configures multiple component carriers (or Band width parts) to the unlicensed band, the communication apparatus can perform the LBT for each component carrier. For example, the communication apparatus performs carrier sense during a common time among the component carriers and can perform frame transmission in a component carrier in which a radio medium can be determined to be in an idle state. For example, the communication apparatus can select one component carrier from the multiple component carriers and perform the LBT including a random back-off period in the component carrier. At this time, in component carriers other than the component carrier, the communication apparatus can perform carrier sense from a timing which is a prescribed time earlier than a timing at which the carrier sense of the component carrier is completed as a starting point. The communication apparatus can then transmit the frame in the component carrier in which the idle state of the radio medium can be determined.

Although the communication apparatus performs the LBT prior to frame transmission, since the random back-off period is configured in the carrier sense period, the timing at which the LBT is completed in a secondary cell does not necessarily match a frame boundary (subframe boundary, slot boundary, symbol boundary) of a primary cell. For this reason, in order to start transmission of a data signal after completion of the LBT, the communication apparatus can transmit a signal from the middle of the frame (subframe, slot, symbol). For example, the communication apparatus can transmit a subframe in which a period of 0.5 ms in the first half is configured to be a blank (null period) at the time of transmitting a subframe with a length of 1 ms by a secondary cell. For example, the communication apparatus can transmit a subframe in which at least one slot is configured to be a blank (null period) among multiple slots constituting a subframe with a length of 1 ms. For example, the communication apparatus can transmit a slot in which at least one symbol is configured to be a blank among slots including 14 symbols. For example, the communication apparatus can transmit a symbol in which at least one sample is configured to be a blank among samples constituting a symbol.

Note that in a case that the communication apparatus according to the present embodiment receives a frame partially including a blank as described above, a reception operation for the blank period is not required. Note that in a case that the communication apparatus transmits a frame partially including a blank as described above, it is possible to transmit a dummy signal in the blank period. This is because, even in a case that the communication apparatus can transmit a frame partially including a blank, a timing at which the LBT is completed and a signal transmission timing of the frame partially including the blank do not necessarily match each other, by transmitting the dummy signal during a period from the timing at which the LBT is completed to the signal transmission timing, it is possible to reserve the radio medium. However, it goes without saying that, in a time resource in which the radio medium cannot be determined to be in the idle state by the LBT, the communication apparatus desirably transmits no dummy signal.

In addition, in the communication apparatus, the end position of the MCOT in the secondary cell does not match the frame boundary (subframe boundary, slot boundary, symbol boundary) in some cases. Accordingly, the communication apparatus can stop transmission in the middle of the frame (subframe, slot, symbol). For example, the communication apparatus can transmit a subframe in which a period of 0.5 ms in the latter half is configured to be a blank (null period) at the time of transmitting a subframe with a length of 1 ms by a secondary cell. Note that the terminal apparatus is notified of the blank (null period) of the sub frame by the DCI or the higher layer signaling.

Furthermore, in a case that the communication apparatus transmits the frame by the secondary cell, a signal having a comb tooth-shaped spectrum can be used. Here, the communication apparatus can generate the comb tooth-shaped spectrum in resource block units. For example, the communication apparatus takes one of comb teeth as one resource block and can configure the comb teeth at a periodicity of 10 resource blocks. By performing such interlaced transmission, by changing the starting position of the comb tooth-shaped spectrum, the communication apparatus can obtain interlacing candidates of an amount corresponding to intervals of the comb teeth (10 interlacing candidates according to the example described above) used for transmission. The communication apparatus can select at least one from the multiple interlacing candidates and transmit a frame, and can transmit a frame using the interlacing candidate configured by the base station apparatus.

In a case of transmitting a frame in a secondary cell configured in an unlicensed band, the terminal apparatus can transmit, in addition to scheduled uplink transmission (SUL) for transmitting a frame in accordance with scheduling assignment from the base station apparatus, a frame by autonomous uplink transmission (Autonomous UL (AUL)) for autonomously performing frame transmission. The base station apparatus can configure uplink transmission of the terminal apparatus in Channel Occupancy Time (COT) acquired by LBT, and the base station apparatus can allow the AUL in part of a time resource of the COT. For example, the base station apparatus can notify the terminal apparatus of information indicating whether or not the AUL can be configured to a subframe and a slot included in the COT. In addition, the base station apparatus can notify, by DCI, the terminal apparatus of whether or not the AUL is actually configured in a subframe or a slot notified as those for which the AUL can be configured. The terminal apparatus can perform frame transmission through the AUL in a subframe or a slot for which the AUL is configured by the base station apparatus. Furthermore, in the interlaced transmission described above, the base station apparatus can notify the terminal apparatus of interlacing candidates that can be used for the AUL beforehand, and thus the terminal apparatus can select at least one from the interfacings available for the AUL and perform AUL transmission of the frame.

The base station apparatus according to the present embodiment can change the number of beam candidates used for beamforming (the number of beam direction candidates) in accordance with a radio environment in the periphery. The base station apparatus can change the number of candidates of the beam in accordance with a base station apparatus density in the periphery. In a state of a high base station apparatus density, in a case that the number of beam candidates of the base station apparatus is large, the number of beams with large interference power given to terminal apparatuses other than the terminal apparatus connected to the base station apparatus itself also increases. Furthermore, in a state of the high base station apparatus density, the base station apparatus does not need to increase the number of beam candidates to maintain the coverage. This is because, in a case that the base station density is high, since there are of course many base station apparatuses that the terminal apparatus can observe, it is not necessary to forcibly maintain a connection state with a specific base station apparatus, and it is sufficient to perform a handover. The base station apparatus limits the number of beam candidates, whereby the base station apparatus can reduce the interference power given to those other than the connected terminal apparatus. Furthermore, the limitation in the number of beam candidates that can be used by the base station apparatus also means that time required for a beam sweep that the base station apparatus determines the configuration of beamforming can be reduced.

The base station apparatus according to the present embodiment can perform a beam sweep using a signal (SSB or the like) including a synchronization signal. The base station apparatus can transmit one or multiple SSBs in a prescribed period (SSB window, SSB Occasion, SSB Burst, transmission window, SSB measurement period). In the prescribed period, the base station apparatus can transmit SSBs each of which has a different beamforming configuration. A resource on which the base station apparatus transmits the SSB within the prescribed period can be predetermined. For example, the base station apparatus can transmit SSBs at multiple predetermined time resource positions (subframe positions, slot positions, symbol positions, and sample positions), respectively. By controlling in this manner, for example, the terminal apparatus that has received the multiple SSBs can feed back information (SSB index) indicating a radio resource on which an SSB with the best reception quality has been received, to the base station apparatus. The base station apparatus can recognize that the configuration of the beamforming used for the transmission of the SSB indicated by the feedback is most preferable for the terminal apparatus. Note that the terminal apparatus can recognize the SSB index by system information (MIB, SIB), or the like transmitted on the PBCH.

The base station apparatus can configure the length of the SSB window (Transmission window size, measurement period). For example, the base station apparatus according to the present embodiment can configure multiple lengths (SSB window durations) as the length of the SSB window, and notify the terminal apparatus thereof. The base station apparatus can define the length of the SSB window using absolute time, such as 5 ms or 1 ms, and can define it using an indicator such as a frame length (subframe length, slot length, symbol length, sample length). However, it is preferable that the base station apparatus according to the present embodiment include the length of the SSB window (e.g., 1 ms or 0.5 ms) that is shorter than the length of the SSB window serving as a reference (for example, 5 ms). This is because, in the case the base station apparatus limits the number of candidates of the beam as indicated above, the number of SSBs transmitted for the beam sweep can also be reduced. Accordingly, in a case that the base station apparatus limits the number of beam candidates, shortening also the length of the SSB window makes it possible to shorten the time required for the synchronization processing and the beam sweep of the terminal apparatus.

Furthermore, the base station apparatus can configure a time resource for transmitting the SSB in the SSB window. The base station apparatus can use an ID (cell ID) indicating the base station apparatus as a variable in determining the time resource for transmitting the SSB. For example, the base station apparatus can determine a periodicity for transmitting the SSB in the SSB window. Furthermore, in a case of periodically transmitting the SSB, the base station apparatus can determine a time resource for transmitting the SSB first in the SSB window. The base station apparatus can determine a time resource for transmitting the SSB first in the SSB window based on the cell ID.

Furthermore, the base station apparatus can periodically configure the SSB window itself. The base station apparatus can configure a value of a periodicity of the SSB window. For example, in a case that the length of the SSB window is 5 ms, in a case of configuring the periodicity of the SSB window to 5 ms, the base station apparatus can always communicate in a state in which the SSB window is configured. The base station apparatus according to the present embodiment can configure a value that is shorter than the length of the SSB window serving as a reference (for example, 5 ms), to the periodicity of the SSB window. This is because, in a case that the base station apparatus reduces the length of the SSB window, the period in which the base station apparatus cannot transmit the SSB is prolonged in a case that the periodicity of the SSB window is long.

Furthermore, in a case that an SSB window that is shorter than 5 ms is configured, the maximum number L of SSBs transmitted in the SSB window may also be reduced. The maximum number L of SSBs in the SSB window may vary depending on a carrier frequency (frequency range) and subcarrier spacing of the SSB. For example, in a case that the length of the SSB window is greater than or equal to 5 ms, and in a case that the subcarrier spacing is 15 kHz or 30 kHz, L=4 is obtained in a case that the carrier frequency is less than or equal to 3 GHz, and L=8 is obtained in a case that the carrier frequency is greater than 3 GHz and less than or equal to 6 GHz. Furthermore, in a case that the length of the SSB window is greater than or equal to 5 ms, in a case that the subcarrier spacing is 120 kHz or 240 kHz, and in a case that the carrier frequency is greater than 6 GHz, L=64 is obtained. In a case that the length of the SSB window is shorter than 5 ms (e.g., 1 ms), in a case that the subcarrier spacing is 15 kHz or 30 kHz, L=2 may be used, and in a case of 120 kHz or 240 kHz, L=16 may be used. Note that the length of the SSB window can be made shorter than 5 ms only in a case that the subcarrier spacing is 120 kHz or 240 kHz (the carrier frequency is greater than 6 GHz).

The base station apparatus can configure the same beamforming for SSBs that is transmitted, between the SSB windows, with the same time resource (e.g., an SSB that is transmitted first in the SSB window) or the same SSB index, and transmit them. In other words, this means that the base station apparatus can transmit the SSBs being QCL between the SSB windows. In this case, since the terminal apparatus can recognize the SSBs that the base station apparatus configures the same beamforming therefor and transmits, by receiving the SSB with a different configuration of reception beamforming at the time of receiving the SSB, the terminal apparatus can perform a reception beam sweep for recognizing a reception beamforming configuration preferable for the terminal apparatus (accurately, preferable for receiving the SSB).

The base station apparatus according to the present embodiment can transmit SSBs to be QCL in the same SSB window. For example, the base station apparatus can configure the same beamforming for SSBs having a common value of remainder obtained by dividing the time index for transmitting the SSB in the SSB window by a prescribed value, and transmit them. For example, the base station apparatus can notify the terminal apparatus of the number of SSBs to be QCL, that are continuously transmitted. In a state in Which the base station apparatus has configured the number of SSBs to be QCL that are continuously transmitted as two, and in a case that the time index with which the base station apparatus transmits the SSBs in the SSB window is 1, 5, 9, and 13, the base station apparatus can configure the same beamforming for SSBs that are transmitted with the time indexes of 1 and 5. In addition, the base station apparatus can configure the same beamforming for SSBs that are transmitted with the time indexes of 9 and 13. For example, in a case of periodically transmitting the SSB in the SSB window, the base station apparatus can determine, based on the initial index with which the SSB is transmitted in the SSB window, whether or not the subsequent SSBs are QCL, with respect to the initial SSB. For example, in a case that there are 2 and 8 as candidates for the first index with which the SSBs are transmitted in the SSB window, the base station apparatus can configure the same beamforming for SSBs transmitted in the same SSB window and transmit them in a case of transmitting the SSB from 2 as the time index, and can transmit the subsequent SSBs without necessarily configuring the same beamforming in a case of transmitting the SSB from 8 as the time index. Furthermore, the base station apparatus can also notify, by bitmap, the terminal apparatus of whether or not each of the SSBs transmitted in the SSB window is QCL. The information notified by the bitmap may be, for example, information of 1 bit indicating whether or not the SSB indicated by the bitmap is QCL with respect to the SSB to be transmitted first in the same SSB window, or information of multiple bits indicating which SSB each is QCL, with respect to SSB. As described above, by transmitting the SSB configured to be QCL as the SSB to be transmitted in the same SSB window, the terminal apparatus can perform a reception beam sweep in the same SSB window, and the reception quality of the terminal apparatus can be improved during a short time lapse. Note that in a case that the SSBs to be transmitted in the same SSB window are configured to be QCL, a method may be used in which the QCL is configured for indexes with the same quotient, in addition to the method in which the QCL is configured for the indexes with the same remainder as described above. In such a method, the indexes for which the QCL is configured can be continuously allocated.

Note that a value that the base station apparatus can configure to the SSB window can be configured by using a frequency band (carrier frequency) in which the base station apparatus transmits the SSB. For example, in a case that the SSB is transmitted in a frequency band greater than or equal to a prescribed value, the base station apparatus can configure the length of the SSB window to a length shorter than the length of the SSB window configured in a case that the SSB is transmitted in a frequency band smaller than the prescribed value.

The base station apparatus can describe information related to the configuration of the SSB window described above in higher layer signaling such as system information such as MIB/SIB, an RRC message, or the like. Furthermore, the base station apparatus can share the configuration related to the SSB window beforehand with the terminal apparatus by describing in the specification and the like. The terminal apparatus can configure a reception operation based on information related to the configuration of the SSB window notified by the base station apparatus.

Note that the base station apparatus can configure signal processing related to the SSB window that has been described above, also for the SCell. In this case, the base station apparatus can notify the terminal apparatus of information related to the SSB window via the PCell. In this case, the base station apparatus can configure lengths of the SSB window, periodicities of the SSB window, and positions of time resources for allocating the SSB in the SSB window, that are different each other, for the PCell and the SCell, respectively. For example, in a case that the base station apparatus configures different subcarrier spacings between the PCell and the SCell, since it is not necessarily optimal for the PCell and the SCell to have the same length of the SSB window, the base station apparatus according to the present embodiment can perform optimal configurations of the SSB window for the PCell and the SCell, respectively.

Note that the base station apparatus according to the present embodiment can consider backward compatibility at the time of performing configuration related to the SSB window. For example, it is assumed that, a terminal apparatus that corresponds only to the length of the SSB window serving as a reference (e.g., 5 ms) is separately connected to the base station apparatus. At this time, the base station apparatus can configure an SSB window (second SSB window) shorter than the length of the SSB window serving as the reference (first SSB window). At this time, the base station apparatus according to the present embodiment can align a position of a time resource of the SSB transmitted in the second SSB window with a position of a time resource for transmitting the SSB in the first SSB window. By controlling in this manner, the terminal apparatus not corresponding to the second SSB window can also receive the SSB transmitted by the base station apparatus at least in the second SSB window. Note that the base station apparatus need not make all of the time indexes for allocating the SSB common between the first SSB window and the second SSB window, and it is sufficient that at least part thereof is common.

Furthermore, the base station apparatus may also prepare two or more types of SSB Windows. At this time, between the first SSB window and the second SSB window, it is not necessary to make the number of SSBs (density of SSB) per unit time (e.g. per 1 ms) or per unit indicator (e.g., per one frame, per one subframe, per one slot, or the like) common. For example, in a case that the second SSB window is configured, the base station apparatus can make the density of the SSB higher than that of the first SSB window. For example, in a case that the base station apparatus configures the second SSB window, by configuring so as to transmit the SSB also on a new time resource in addition to the time resource of the SSB configured in the first SSB window, the base station apparatus can more flexibly transmit the SSB to the terminal apparatus corresponding to the second SSB window while transmitting the SSB that can also be received by the terminal apparatus corresponding to only the first SSB window. Note that it goes without saying that the density of SSB common between SSB Windows can be configured.

2. Second Embodiment

The communication apparatus (base station apparatus and terminal apparatus) according to the present embodiment can communicate in a frequency band in which a license is required (licensed band) and/or a frequency band in which a license is not required (unlicensed band). The receiver included in the communication apparatus according to the present embodiment includes a function of performing carrier sense, which will be described later.

The communication apparatus according to the present embodiment can reserve a radio medium particularly in the unlicensed hand by carrier sense (LBT). At this time, the communication apparatus has different lengths of the radio medium that can be reserved by the LBT (e.g., in a case that an idle state of the radio medium can be determined by the LBT, a period in which the communication apparatus can continuously transmit the frame in the radio medium), depending on parameters configured to the LBT to be performed. Specifically, the shorter the time in which the communication apparatus performs the LBT is, the shorter the length of the radio medium that can be reserved (MCOT) is. The length of the MCOT that the communication apparatus can obtain by the LBT is defined for each priority class.

The communication apparatus according to the present embodiment can determine the length of the SSB window in accordance with the priority class used at the time of performing the LBT. For example, in a case that the radio medium is reserved with a priority class having a high priority in which the length of the MCOT that can be reserved is 1 ms or 2 ms, the communication apparatus can configure the length of the SSB window to a length (e.g., 1 ms) shorter than the reference length (e.g., 5 ms). On the other hand, in a case that the radio medium is reserved with a priority class having a low priority in which the length of the MCOT is 8 ms or 10 ms, the communication apparatus can configure the SSB window so as to have the reference length (e.g., 5 ms). Note that in a case that the radio medium is reserved with the priority class having the low priority in which the length of the MCOT is 8 ms or 10 ms, the communication apparatus can configure the maximum value that can be configured to the length of the SSB window to 4 ms.

By configuring the length of the SSB window in accordance with the priority class, the communication apparatus can determine the length of the SSB window in accordance with the length of the acquired MCOT, and thus the communication apparatus can efficiently utilize the acquired radio medium to transmit the SSB.

Furthermore, depending on the length of the SSB window, the condition of the carrier sense (Listen Before Talk (LBT)) may be changed. For example, in a case that the length of the SSB window is 5 ms, carrier sense with random back-off is performed, and in a case that the length of the SSB window is 1 ms, carrier sense in a fixed period is performed. Note that even in a case that the length of the SSB window is 5 ms, carrier sense in the fixed period may be performed in a case that an observation period of the SSB is within 1 ms.

Note that the method in which the base station apparatus notifies the terminal apparatus of the information indicating the spatial relation that has been described above is not limited to any specific one. For example, the base station apparatus can semi-statically configure the spatial relation for the terminal apparatus using higher layer signaling (RRC signaling), and can dynamically configure the spatial relation for the terminal apparatus using DCI.

3. Third Embodiment

Figure 6:
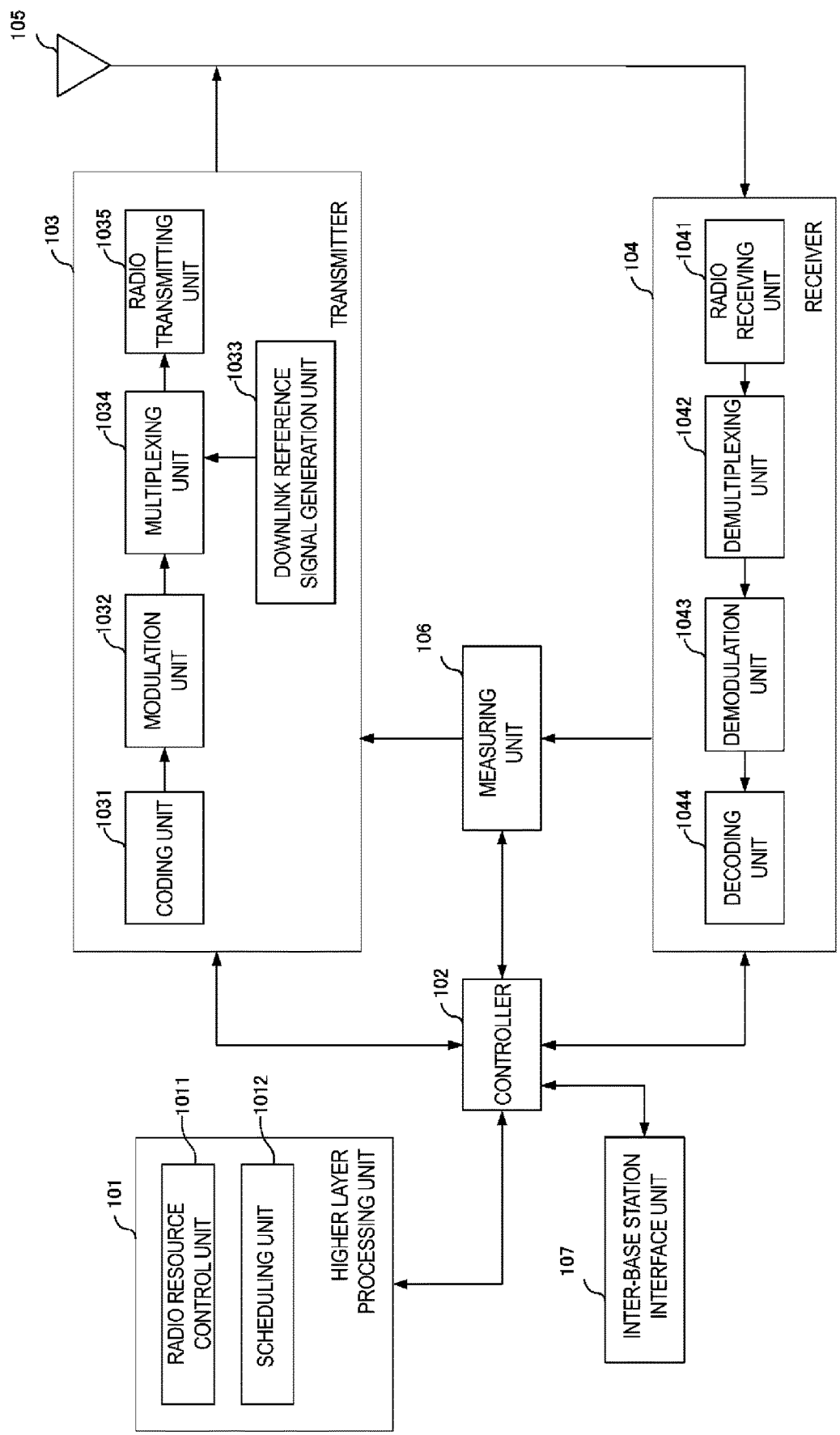
FIG. 6 is a block diagram illustrating a configuration example of a base station apparatus according to the present embodiment.

The communication apparatus (base station apparatus and terminal apparatus) according to the present embodiment Obtains information related to a base station apparatus density in the periphery or information related to the number of beam candidates used by base station apparatuses in the periphery by exchanging the information among the communication apparatuses (base station apparatuses). For the configuration of the base station apparatus, the configuration in which an inter-base station interface unit 107 is added to the configuration illustrated in FIG. 2 is used. FIG. 6 illustrates an example of the configuration of this base station apparatus. For the configuration of the terminal apparatus, the configuration illustrated in FIG. 3 is used.

The inter-base station interface unit 107 is an interface unit for exchanging information with other base station apparatuses without passing through the higher layer processing unit 101, and the connection scheme is not particularly specified. As an example, an Si interface through a core net and an X2 interface without passing through the core net may be used. The information to be exchanged is not also particularly limited, and the unit may be used to exchange load information of the base station and exchange of information to be used in an inter-base station handover.

In a case of exchanging information with another base station apparatus through the inter-base station interface unit 107, the base station apparatus exchanges information related to the base station apparatus density in the periphery or information related to the number of beam candidates used by the base station apparatuses in the periphery. As an example, the information may be exchanged that includes a cell ID allocated to the base station apparatus, information related to a position of the base station apparatus, the maximum value of the number of beam candidates that the base station apparatus can use, the number of beam candidates that the base station apparatus can simultaneously use, the number of terminals that is currently connected, and information of a radio resource that is currently used (a resource block that is used, a frequency direction of a resource element, information of a time direction, information of the number of beam candidates, or the like). Furthermore, information related to a synchronization signal such as the configuration of the SSB window or the like may be exchanged.

As a result of exchanging information with another base station apparatus, in a case that it can be determined that the density of the base station apparatuses that are operating in the periphery of the base station apparatus itself or the number of beam candidates that are being used in the periphery of the base station apparatus itself is increased more than before, the number of beam candidates used in the base station itself may be reduced, and in a case that it can be determined that the density of the base station apparatuses that are operating in the periphery of the base station apparatus itself or the number of beam candidates that are being used in the periphery of the base station apparatus itself is decreased more than before, the number of beam candidates used in the base station itself may be increased.

As described above, by exchanging information with another base station apparatus and controlling the number of beam candidates based on the information, the base station apparatus can reduce interference power given to those other than the connected terminal apparatus.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The invention claimed is:

1. A base station apparatus configured to communicate with a terminal apparatus, the base station apparatus comprising:
   radio resource control circuitry configured to configure a plurality of resources for transmitting a plurality of synchronization signal blocks (SSBs) within a predetermined transmission window, the plurality of SSBs including at least a first SSB and a second SSB; and
   transmission circuitry configured to transmit the plurality of SSBs within the predetermined transmission window in an unlicensed band, wherein:
   the first SSB comprises a first primary synchronization signal (PSS), a first secondary synchronization signal (SSS), and a first physical broadcast channel (PBCH),
   the second SSB comprises a second PSS, a second SSS, and a second PBCH,
   the transmission circuitry is further configured to transmit first information associated with a quasi-co location (QCL) between the first SSB and the second SSB, and
   in a case that a first remainder obtained by dividing a first time-domain index for transmitting the first SSB by a first predetermined value is equal to a second remainder obtained by dividing a second time-domain index for transmitting the second SSB by a second predetermined value, transmission circuitry is further configured to transmit the plurality of SSBs by applying the QCL to the first SSB and the second SSB in which the first remainder and the second remainder correspond to the first SSB and the second SSB, respectively.

2. The base station apparatus according to claim 1, wherein the transmission circuitry is further configured to:
   transmit second information indicating a size of the predetermined transmission window, and
   transmit third information indicating a periodicity, the periodicity being configured for the predetermined transmission window.

3. The base station apparatus according to claim 1, wherein
   the first information indicates a quantity of blocks of the plurality of SSBs that the terminal apparatus assumes to be transmitted within the predetermined transmission window.

4. The base station apparatus according to claim 1, wherein
   the transmission circuitry is further configured to transmit the plurality of SSBs within the predetermined transmission window by applying a same transmission coding.

5. A terminal apparatus configured to communicate with a base station apparatus, the terminal apparatus comprising:
   reception circuitry configured to receive a plurality of synchronization signal blocks (SSBs) within a predetermined transmission window in an unlicensed band, the plurality of SSBs including at least a first SSB and a second SSB and being transmitted by using a plurality of resources within the predetermined transmission window, wherein:
   the first SSB comprises a first primary synchronization signal (PSS), a first secondary synchronization signal (SSS), and a first physical broadcast channel (PBCH),
   the second SSB comprises a second PSS, a second SSS, and a second PBCH,
   the reception circuitry is further configured to receive first information associated with a quasi-co location (QCL) between the first SSB and the second SSB, and
   in a case that a first remainder obtained by dividing a first time-domain index for transmitting the first SSB by a first predetermined value is equal to a second remainder obtained by dividing a second time-domain index for transmitting the second SSB by a second predetermined value, the reception circuitry is further configured to receive the plurality of SSBs, the plurality of SSBs being transmitted by applying the QCL to the first SSB and the second SSB in which the first remainder and the second remainder correspond to the first SSB and the second SSB, respectively.

6. The terminal apparatus according to claim 5, wherein the reception circuitry is further configured to:
   receive second information indicating a size of the predetermined transmission window, and
   receive third information indicating a periodicity, the periodicity being configured for the predetermined transmission window.

7. The terminal apparatus according to claim 5, wherein the first information indicates a quantity of blocks of the plurality of SSBs that the terminal apparatus assumes to be transmitted within the predetermined transmission window.

8. The terminal apparatus according to claim 5, wherein the reception circuitry is further configured to receive the plurality of SSBs within the predetermined transmission window by applying a same transmission coding.

9. A communication method for a base station apparatus configured to communicate with a terminal apparatus, the communication method comprising:
   configuring a plurality of resources for transmitting a plurality of synchronization signal blocks (SSBs) within a predetermined transmission window, the plurality of SSBs including at least a first SSB and a second SSB;
   transmitting the plurality of SSBs within the predetermined transmission window in an unlicensed band, wherein:
   the first SSB comprises a first primary synchronization signal (PSS), a first secondary synchronization signal (SSS), and a first physical broadcast channel (PBCH),
   the second SSB comprises a second PSS, a second SSS, and a second PBCH;
   transmitting first information associated with a quasi-co location (QCL) between the first SSB SSBs and the second SSB, and
   in a case that a first remainder obtained by dividing a first time-domain index for transmitting the first SSB by a first predetermined value is equal to a second remainder obtained by dividing a second time-domain index for transmitting the second SSB by a second predetermined value, transmitting the plurality of SSBs by applying the QCL to the first SSB and the second SSB in which the first remainder and the second remainder correspond to the first SSB and the second SSB, respectively.

10. A communication method for a terminal apparatus configured to communicate with a base station apparatus, the communication method comprising:
   receiving a plurality of synchronization signal blocks (SSBs) within a predetermined transmission window in an unlicensed band, the plurality of SSBs including at least a first SSB and a second SSB and being transmitted by using a plurality of resources within the predetermined transmission window, wherein:
   the first SSB comprises a first primary synchronization signal (PSS), a first secondary synchronization signal (SSS), and a first physical broadcast channel (PBCH),
   the second SSB comprises a second PSS, a second SSS, and a second PBCH; receiving first information associated with a quasi-co location (QCL) between the first SSB and the second SSB, and
   in a case that a first remainder obtained by dividing a first time-domain index for transmitting the first SSB by a first predetermined value is equal to a second remainder obtained by dividing a second time-domain index for transmitting the second SSB by a second predetermined value, receiving the plurality of SSBs, the plurality of SSBs being transmitted by applying the QCL to the first SSB and the second SSB in which the first remainder and the second remainder correspond to the first SSB and the second SSB, respectively.

* * * * *